United States Patent
Fox et al.

(10) Patent No.: US 11,321,528 B2
(45) Date of Patent: May 3, 2022

(54) CHAT DISCOURSE CONVOLUTION

(71) Applicant: INTERNATIONAL BUSINESS MACHINES CORPORATION, Armonk, NY (US)

(72) Inventors: Jeremy R. Fox, Georgetown, TX (US); Kelley Anders, East New Market, MD (US); Trudy L. Hewitt, Cary, NC (US); Wesley A. Hoffler, Tipperary (IE); Sonya Leech, Mullhuddart (IE); Jonathan Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 343 days.

(21) Appl. No.: 16/356,753

(22) Filed: Mar. 18, 2019

(65) Prior Publication Data
US 2020/0302014 A1    Sep. 24, 2020

(51) Int. Cl.
*G06F 21/64* (2013.01)
*G06F 40/284* (2020.01)
*H04L 51/04* (2022.01)

(52) U.S. Cl.
CPC ............ *G06F 40/284* (2020.01); *H04L 51/04* (2013.01)

(58) Field of Classification Search
CPC .... G06F 16/951; G06F 16/2255; G06F 16/43; G06F 16/78; G06F 16/9014; G06F 40/10; G06F 40/211; G06F 40/268; G06F 40/289; H04L 9/0643
See application file for complete search history.

(56) References Cited

U.S. PATENT DOCUMENTS

| | | | |
|---|---|---|---|
| 7,570,759 B2* | 8/2009 | Liu | H04L 9/0643 380/28 |
| 8,738,668 B2 | 5/2014 | Pendlebury et al. | |
| 8,995,632 B1 | 3/2015 | Borisovsky et al. | |
| 9,426,239 B2* | 8/2016 | McCandless | G06F 16/335 |
| 9,864,658 B1 | 1/2018 | Barcello | |
| 10,237,246 B1* | 3/2019 | Mulayin | H04L 9/0891 |
| 10,445,415 B1* | 10/2019 | Spellward | G06F 16/353 |
| 10,615,965 B1* | 4/2020 | Goldberg | H04L 51/063 |
| 2002/0123989 A1* | 9/2002 | Kopelman | G06F 16/334 |

(Continued)

FOREIGN PATENT DOCUMENTS

| | | |
|---|---|---|
| CN | 106055531 A | 10/2016 |
| JP | 2009199470 A | 9/2009 |

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — Olujimi A Adesanya
(74) *Attorney, Agent, or Firm* — Cuenot, Forsythe & Kim, LLC

(57) ABSTRACT

Chat discourse convolution can include performing a lexicographic analysis of the content of a chat message of a chat discourse and storing a result of the lexicographic analysis in a database. The convolution can further include generating a hash of the content of the chat message and generating a leximarker. The leximarker can encapsulate a reference to the stored lexicographic analysis as well as the hash of the content of the chat message.

9 Claims, 26 Drawing Sheets

(56) References Cited

U.S. PATENT DOCUMENTS

| | | | |
|---|---|---|---|
| 2002/0156618 A1* | 10/2002 | Mathur | G06F 40/205 |
| | | | 704/9 |
| 2005/0089160 A1* | 4/2005 | Crispin | G06F 9/30065 |
| | | | 380/28 |
| 2005/0198160 A1* | 9/2005 | Shannon | G06Q 10/107 |
| | | | 709/206 |
| 2009/0185677 A1* | 7/2009 | Bugbee | H04L 9/0841 |
| | | | 380/28 |
| 2009/0319506 A1* | 12/2009 | Ngan | G06Q 10/107 |
| 2010/0169361 A1* | 7/2010 | Chen | G06F 16/36 |
| | | | 707/769 |
| 2011/0004663 A1* | 1/2011 | Zito | G06Q 10/107 |
| | | | 709/206 |
| 2011/0099388 A1* | 4/2011 | Hett | H04L 9/3297 |
| | | | 713/193 |
| 2012/0303661 A1* | 11/2012 | Blohm | G06F 40/295 |
| | | | 707/776 |
| 2013/0018963 A1* | 1/2013 | Brauff | H04L 51/10 |
| | | | 709/206 |
| 2013/0289991 A1 | 10/2013 | Eshwar et al. | |
| 2013/0297545 A1* | 11/2013 | Bierner | G06F 40/289 |
| | | | 706/46 |
| 2014/0281941 A1* | 9/2014 | Spellward | G06F 40/103 |
| | | | 715/256 |
| 2014/0303959 A1* | 10/2014 | Orsini | G06F 40/58 |
| | | | 704/2 |
| 2014/0303961 A1* | 10/2014 | Leydon | G10L 13/08 |
| | | | 704/2 |
| 2016/0065519 A1* | 3/2016 | Waltermann | H04L 67/10 |
| | | | 709/206 |
| 2017/0212872 A1* | 7/2017 | Albert | G07C 13/00 |
| 2017/0212916 A1* | 7/2017 | Albert | G06F 40/30 |
| 2018/0278586 A1* | 9/2018 | Driscoll | H04L 9/0662 |

OTHER PUBLICATIONS

Kim, D. et al., "Existing Deduplication Technique," In Data Deduplication for Data Optimization for Storage and Network Systems, pp. 23-76, 2017, Springer Int'l. Publishing, Switzerland.

Sedgewick, R. et al., "Chap. 4, Section 2—Sorting and Searching," In Computer Science: An Interdisplinary Approach, [retrieved Mar. 18, 2019] retrieved from the Internet: <https://introcs.cs.princeton.edu/java/42sort/>, 20 pg., Princeton University, 2017.

* cited by examiner

CHAT DISCOURSE CONVOLUTION

BACKGROUND

The present disclosure relates to the field of electronic communications, and more particularly, to online communications over a data communications network.

Online communication via real-time or live transmission of messages, referred to as real-time chat, are widely used by colleagues, family, and friends to communicate and collaborate with one another. Chat messages can be brief and chat recipients can respond quickly, lending a conversational aura to the communication. Real-time chat can be text-based or video-based. Real-time chat can be one-to-one or, with a group chat, a one-to-many. Real-time chat is typically implemented using a Web-based application. A variety a software programs are available to enable real-time chat between individuals via the Internet or other data communications network. With the increasing use of real-time chat, most network and online service providers offer users a chat feature.

SUMMARY

A method includes performing, with a computer, a lexicographic analysis of the content of a chat message of a chat discourse and storing a result of the lexicographic analysis in a database. The method can include generating a hash of the content of the chat message. Additionally, the method can include creating a leximarker. The leximarker can contain the hash of the content of the chat message and a reference to the stored result of the lexicographic analysis.

A system includes a computer having at least one processor programmed to initiate executable operations. The executable operations can include performing a lexicographic analysis of the content of a chat message of a chat discourse and storing a result of the lexicographic analysis in a database. The executable operations also can include generating a hash of the content of the chat message. Additionally, the executable operations can include creating a leximarker. The leximarker can contain the hash of the content of the chat message and a reference to the stored result of the lexicographic analysis.

A computer program product includes a computer-readable storage medium in which is stored program code the program code executable by computer hardware to initiate operations. The operations can include performing a lexicographic analysis of the content of a chat message of a chat discourse and storing a result of the lexicographic analysis in a database. The operations can also include generating a hash of the content of the chat message. Additionally, the operations can include creating a leximarker. The leximarker can contain the hash of the content of the chat message and a reference to the stored result of the lexicographic analysis.

DETAILED DESCRIPTION

Figure 1:
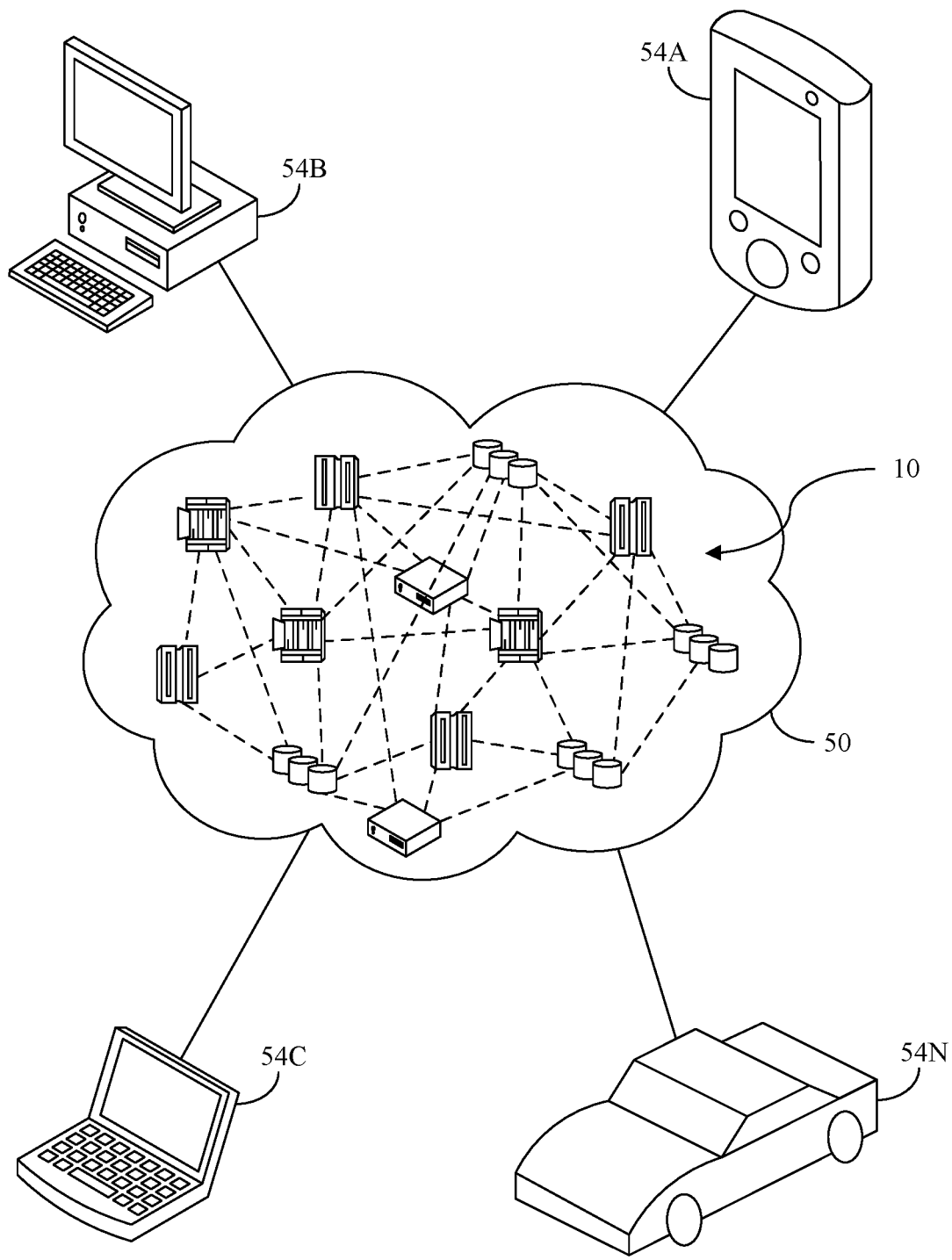
FIG. 1 depicts a cloud computing environment according to an embodiment of the present invention.

The present disclosure relates to online communications over a data communications network, including real-time chat messaging.

With increases in the number of business and social communications using real-time chat, greater and greater quantities of real-time chat data are being stored for future analysis and satisfying retention requirements. Such data can be stored, for example, in a data lake in natural format (e.g., object blobs or files) and can include raw copies of source system data and transformed data that is used for various tasks. Such tasks can include reporting, visualization, analytics, and machine learning. For chat participants themselves, or other analysts with participants' permission, chat discourse archives can provide a rich source of data for various types of analysis. It cannot be assumed, however, that irrespective of size or amount, as more and more data is collected, the data can be efficiently and effectively analyzed so that high-value insights are derived from the data.

The methods, systems, and computer program products disclosed herein compress chat discourse data while preserving the substantive content and meaning of the data. The methods, systems, and computer program products implement a "convolution" of chat discourse data. The term chat discourse convolution is intended herein to connote a folding together of distinct features that harmonize competing objectives—namely reducing the size of chat discourse archives while enabling analytical insights to be extracted more efficiently and more effectively from chat discourse data.

Chat discourse convolution enhances the capabilities of techniques (e.g., data mining) for analyzing chat discourse data. Moreover, chat discourse convolution improves the physical performance of machines used in implementing the various analytical techniques. Reducing the size of chat discourse archives frees up physical memory for storing electronic data. Compressing chat discourse data and removing unnecessary duplications of data enhances the processing capabilities of data processing machines used in searching, sorting, and applying various analytical procedures to analyze the data. Accordingly, chat discourse convolution enables chat discourse data to be analyzed more effectively and efficiently using various machine-implemented procedures.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud-based computing nodes 10 with which local computing devices used by cloud consumers, such as, for example, personal digital assistant (PDA) or cellular telephone 54A, desktop computer 54B, laptop computer 54C, and/or automobile computer system 54N may communicate. Computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
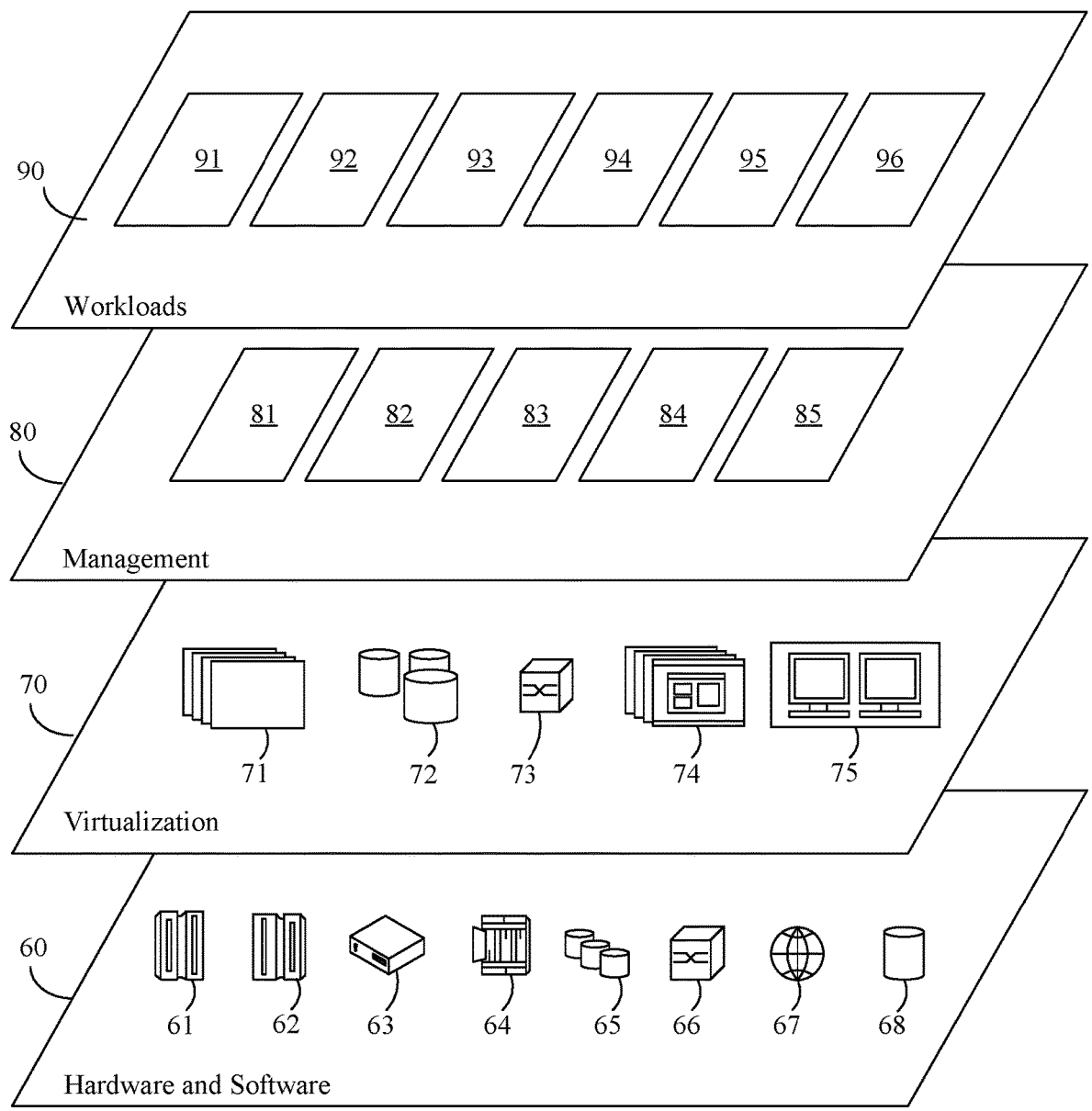
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chat discourse convolution 96.

Chat discourse convolution 96 is capable of performing a lexicographic analysis of the content of a chat message and hashing the message content. Chat discourse convolution 96 includes using results from the lexicographic analysis and the hash of the message content for generating a leximarker. The leximarker is a machine-generated encapsulation of the hash of the content of the chat message and a referencing object, the referencing object providing a link to electronically stored results of the lexicographic analysis of the content of the chat message. By creating the leximarker, chat discourse convolution 96 provides a compressed form of the chat message that, although compressed by hashing, preserves the substantive content of the original chat message.

Chat discourse convolution 96, in one embodiment, includes a database containing machine-generated leximarkers. Corpus linguistic analysis inferences can be derived from the hashed content of the chat message using the corresponding leximarker as contextual data. A database-stored leximarker can enable a lookup (using the referencing object) of contextualized corpus linguistic analysis for a given message or string. In another embodiment, leximarkers can be accessed from a server and configured to communicate via a communication link to a session state object. A remote procedure call can be made to a session state object containing the corpus linguistic analysis for a given message or string.

In a single chat discourse, certain phrases and/or expressions may be repeated in separate messages during the chat discourse. The leximarker is a distinct lexicographical characteristic corresponding to a specific chat message and can uniquely define the chat message. Accordingly, each message that contains the same phrases or expressions can be represented by the same leximarker. With chat discourse convolution, only the leximarker and one copy of the corresponding multiple chat messages comprising repeat phrases or expressions, not each individual chat message, is saved and stored electronically. Moreover, in the aggregate for an archive of multiple chat discourses, there likely are more messages that comprise the same phrases or expressions in one or more other chat discourses. With chat discourse convolution, each such message corresponds to a single, identical leximarker, enabling reductions in memory usage for archiving the chat discourses. The conversational nature of real-time chats increases the likelihood of repetitive phrases and expressions, thereby enhancing a chat discourse convolution system's capability for reducing memory storage. A system for chat discourse convolution can also remove from chat messages certain so-called "stock words," words that can be ignored (and hence removed) without making a message less comprehensible.

The advantages provided by chat discourse convolution 96 extend beyond reductions in memory usage for archiving chat discourses. The reduction of multiple, repeat phrases and expressions into a singleton (and the removal of stock words) can enhance the effectiveness and efficiency of machine-based analyses of chat discourse archives. For certain analytical techniques, creation of a singleton that is representative of multiple occurrences of message expressions and phrases can increase the speed and efficiency with which a machine can carry out the analysis of archived chat discourses. For example, a data processing system performing corpus linguistic analysis for drawing inferences from a hashed text using a leximarker as contextual data is made more effective and efficient by the storing of duplicate messages only once as a singleton rather than as multiple, repetitive messages stored multiple times in multiple locations.

Figure 3:
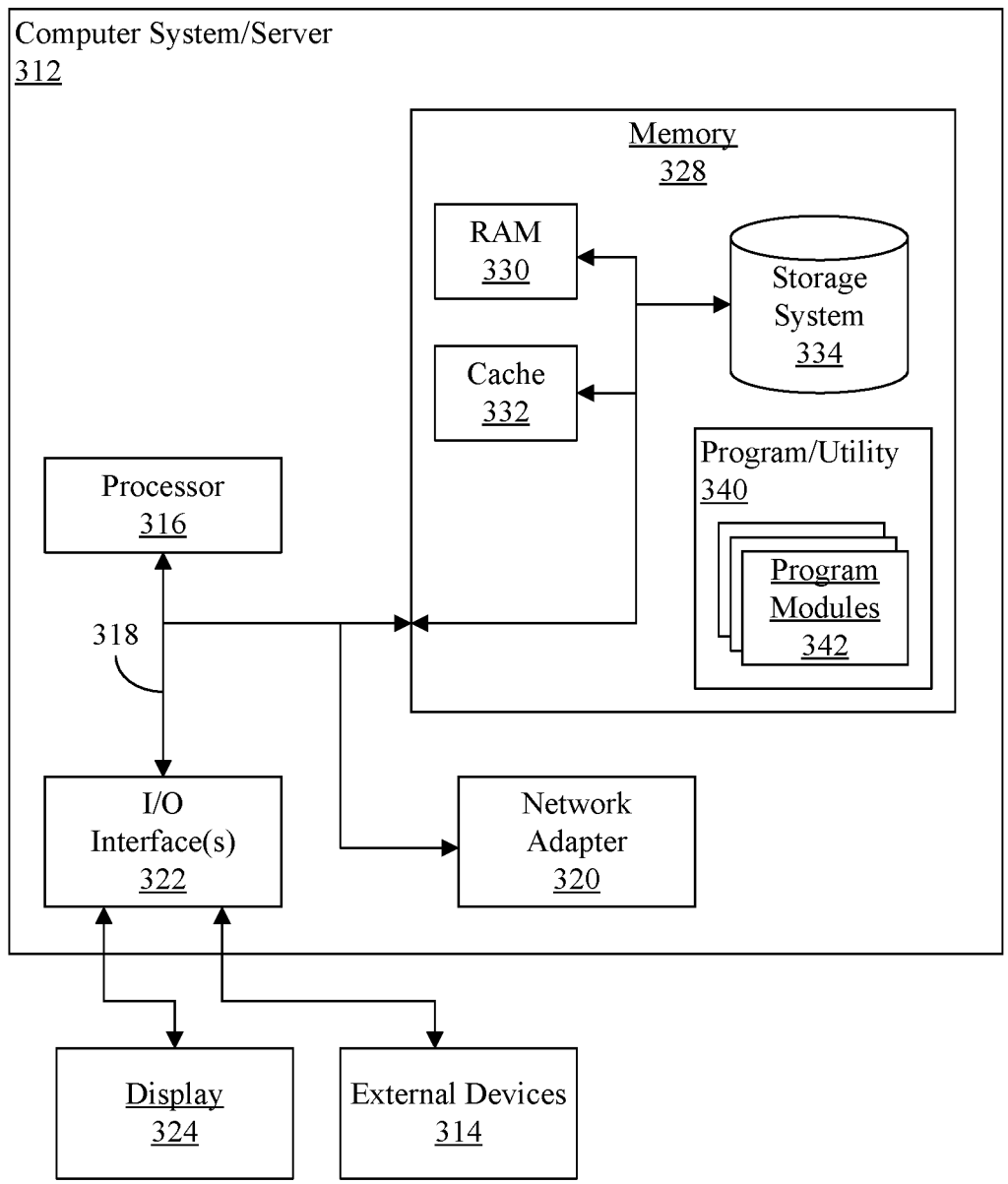
FIG. 3 depicts a cloud computing node according to an embodiment of the present invention.

Referring now to FIG. 3, a schematic of an example of a cloud computing node is shown. Computing node 300 is only one example of a suitable cloud computing node and is not intended to suggest any limitation as to the scope of use or functionality of embodiments described herein. Regardless, computing node 300 is capable of being implemented and/or performing any of the functionality set forth hereinabove.

Computing node 300 includes a computer 312, which is operational with numerous other general-purpose or special-purpose computing system environments or configurations. Examples of well-known computing systems, environments, and/or configurations that may be suitable for use with computer 312 include, but are not limited to, personal computers, servers, thin clients, thick clients, hand-held or laptop devices, multiprocessor systems, microprocessor-based systems, set top boxes, programmable consumer electronics, network PCs, minicomputers, mainframe computers, and distributed cloud computing environments that include any of the above systems or devices, and the like.

Computer 312 may be described in the general context of computer system-executable instructions, such as program modules, being executed by a computer or computing system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer 312 in computing node 300 is shown in the form of a general-purpose computing device. The components of computer 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 312 typically includes a variety of computer-readable media. Such media may be any available media that is accessible by computer 312, and includes both volatile and non-volatile media, removable and non-removable media.

Memory 328 can include computer-readable media in the form of volatile memory, such as random-access memory (RAM) 330 and/or cache memory 332. Computer 312 may further include other removable/non-removable, volatile/non-volatile computer storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the described.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments described herein.

For example, one or more of the program modules may carry out the functions and/or methodologies of chat discourse convolution 96 or portions thereof. Program/utility 340 is executable by processor 316. Program/utility 340 and any data items used, generated, and/or operated upon by computing node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 312 may also communicate with one or more external devices 314 such as a keyboard, a pointing device, a display 324, etc.; one or more devices that enable a user to interact with computer 312; and/or any devices (e.g., network card, modem, etc.) that enable computer 312 to communicate with one or more other computing devices. Such communication can occur via Input/Output (I/O) interfaces 322. Computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples, include, but are not limited to, the following: microcode, device drivers, redundant processing units, external disk drive arrays, RAID systems, tape drives, and data archival storage systems.

While computing node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
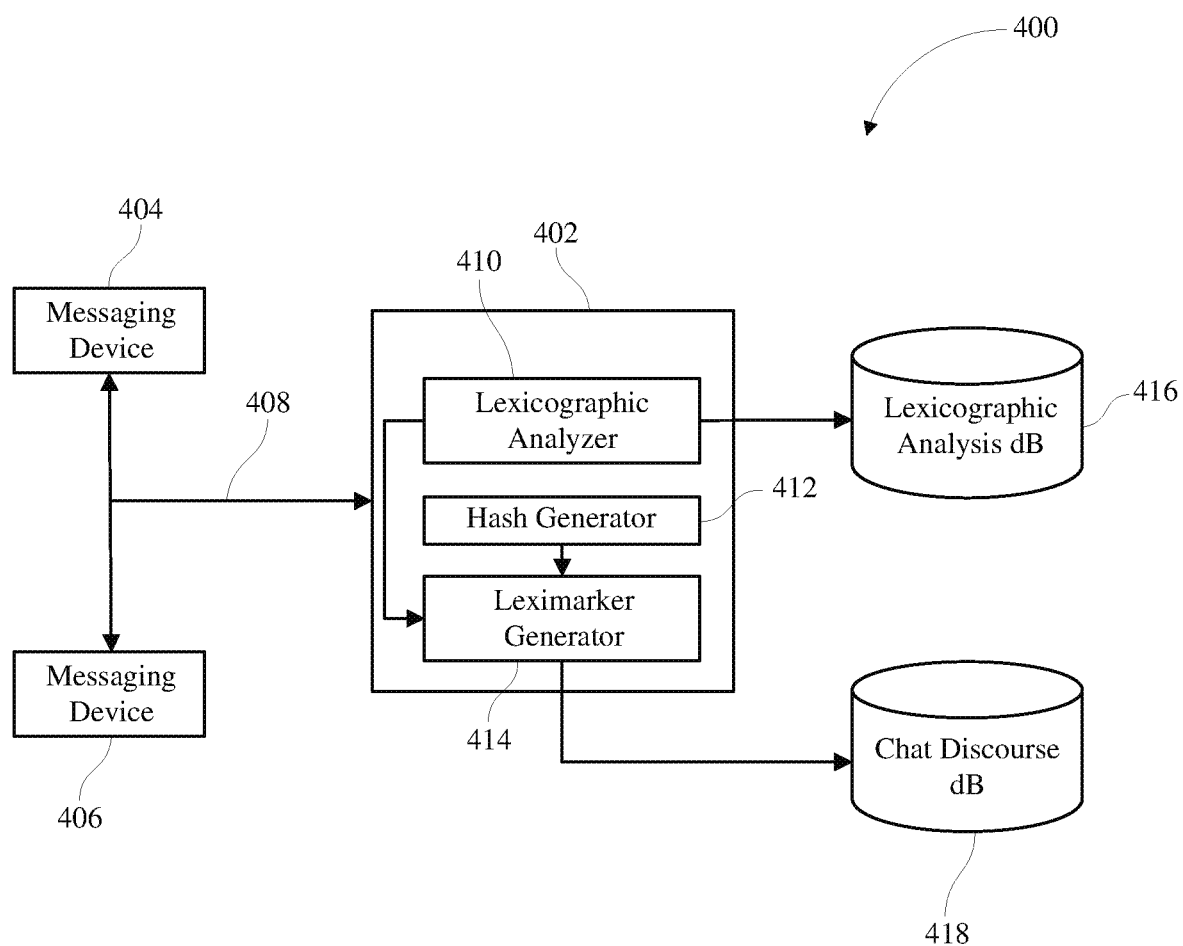
FIG. 4 depicts a chat discourse convolution system according to an embodiment of the present invention.

FIG. 4 depicts one embodiment of a system 400 for performing chat discourse convolution such as chat discourse convolution 96 described in the context of the workload and function examples shown in FIG. 2. System 400 illustratively includes computer 402. Computer 402 can be a general-purpose computer such as computer 312 in FIG. 3, a server (e.g., a cloud-based server), or an application-specific computer. Illustratively, computer 402 is communicatively coupled to messaging devices 404 and 406 via data communication network 408 (e.g., Internet, LAN). Messaging devices 404 and 406 are configured to exchange chat messages when jointly engaged in a chat discourse over data communications network 408. Two messaging devices are shown, but it is noted that any number of such devices can be communicatively coupled to one another and to computer 402 via data communication network 408 and to likewise engage in real-time chats.

System 400 also illustratively comprises two distinct databases communicatively coupled to computer 402: lexicographic analysis database 416 and chat discourse database 418. One or both of lexicographic analysis databases 416 and chat discourse database 418 can be collocated with computer 402. In other embodiments, one or both of lexicographic analysis database 416 and chat discourse database 418 can be located remotely from one another and/or from computer 402. The computer and databases, if remote from one another, can be communicatively coupled via another communication network (not explicitly shown) or data communication network 408.

Computer 402 illustratively includes lexicographic analyzer 410, hash generator 412, and leximarker generator 414. Lexicographic analyzer 410, as well as hash generator 412 and leximarker generator 414, can be implemented as processor-executable code (e.g., program modules such as program modules 342 shown in FIG. 3 or other program code executable by computer hardware). The code can be electronically stored in a memory such as memory 328 and can execute on a processor such as processor 316 when conveyed to the processor via a bus such as bus 318, as also shown in FIG. 3. In other embodiments, one or more of lexicographic analyzer 410, hash generator 412, and leximarker generator 414 can be implemented in hardwired circuitry and/or a combination of circuitry and processor-executable code. The outputs of lexicographic analyzer 410 and of hash generator 412 are conveyed to leximarker generator 414. Lexicographic analyzer 410 also conveys output to lexicographic analysis database 416. The output of leximarker generator 414 is supplied to chat discourse database 418.

Figure 5:
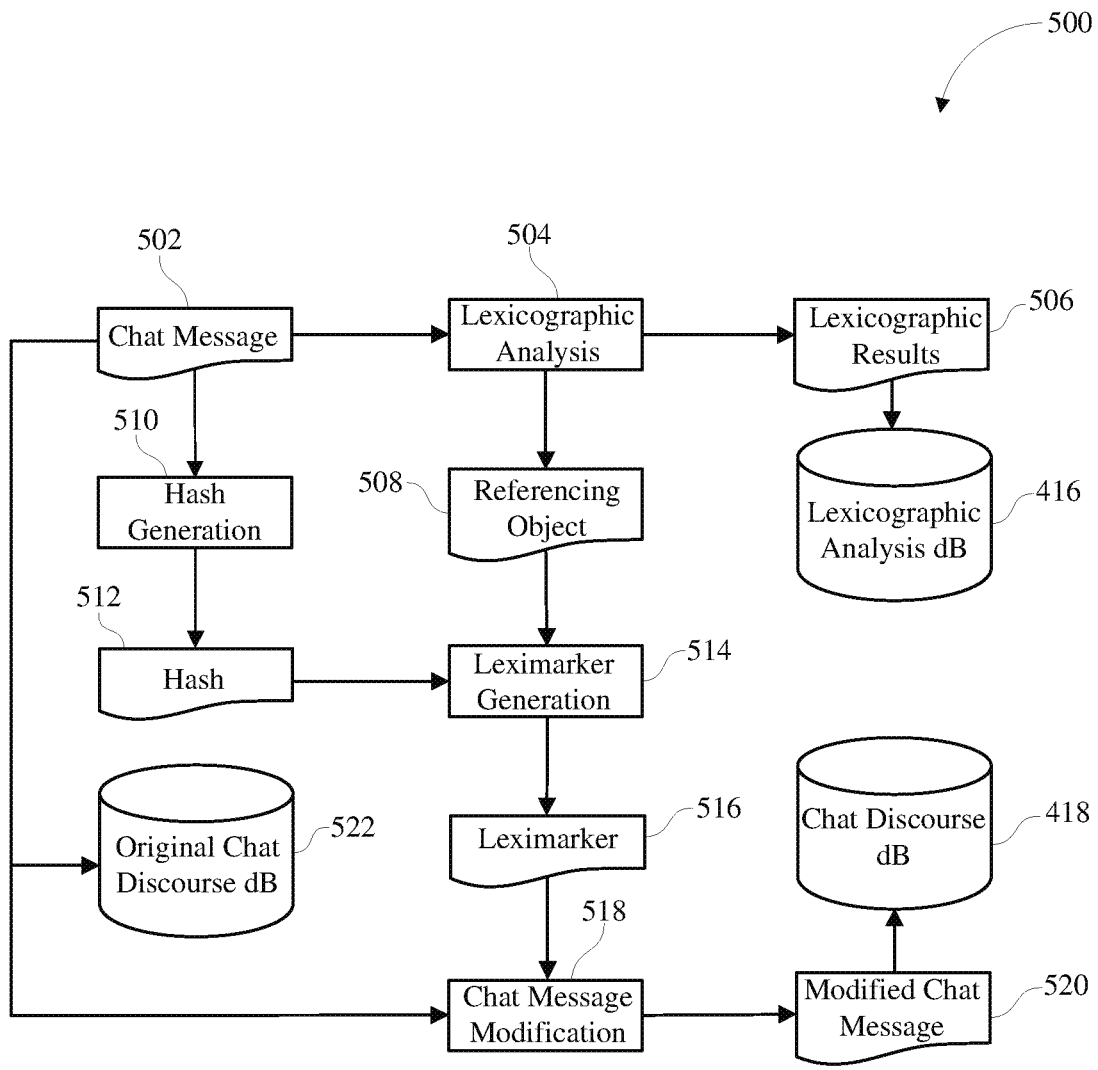
FIG. 5 depicts certain operative features of a chat discourse convolution system according to an embodiment of the present invention.
Figure 6A:
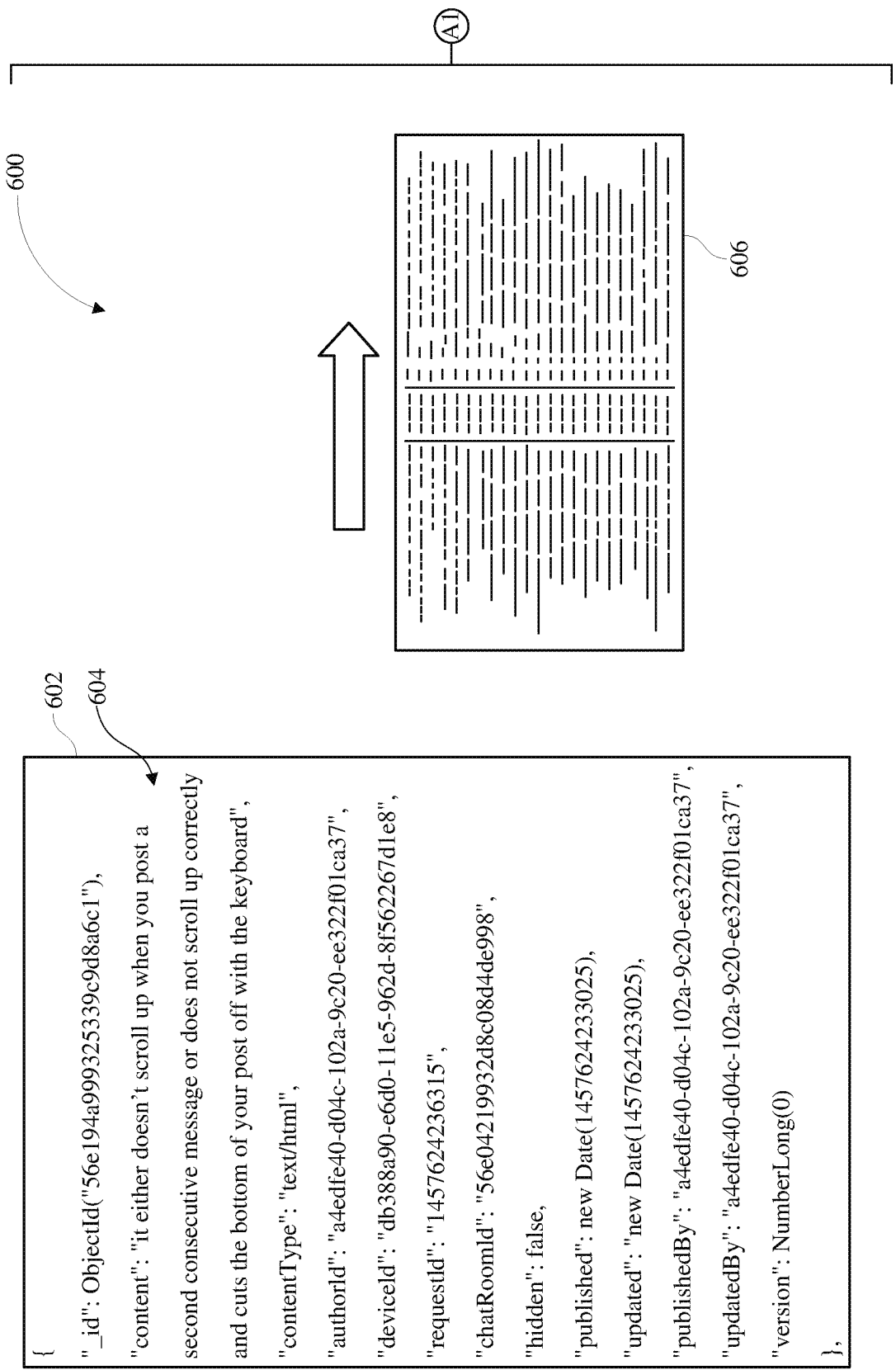
FIGS. 6A-D depict an example of performing a lexicographic analysis by a lexicographic analyzer of a chat discourse convolution system according to an embodiment of the present invention.
Figure 6B:
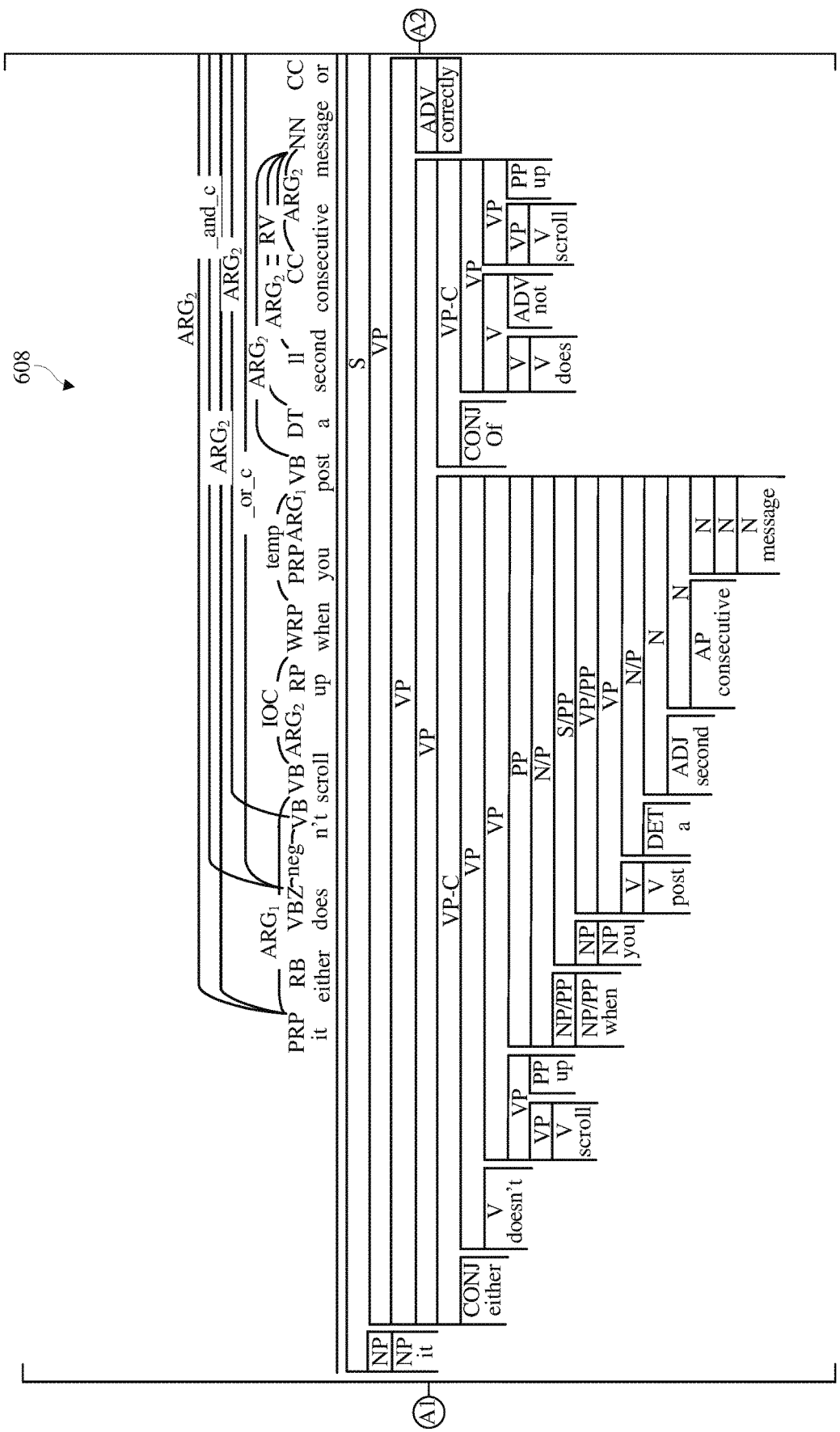
Figure 6C:
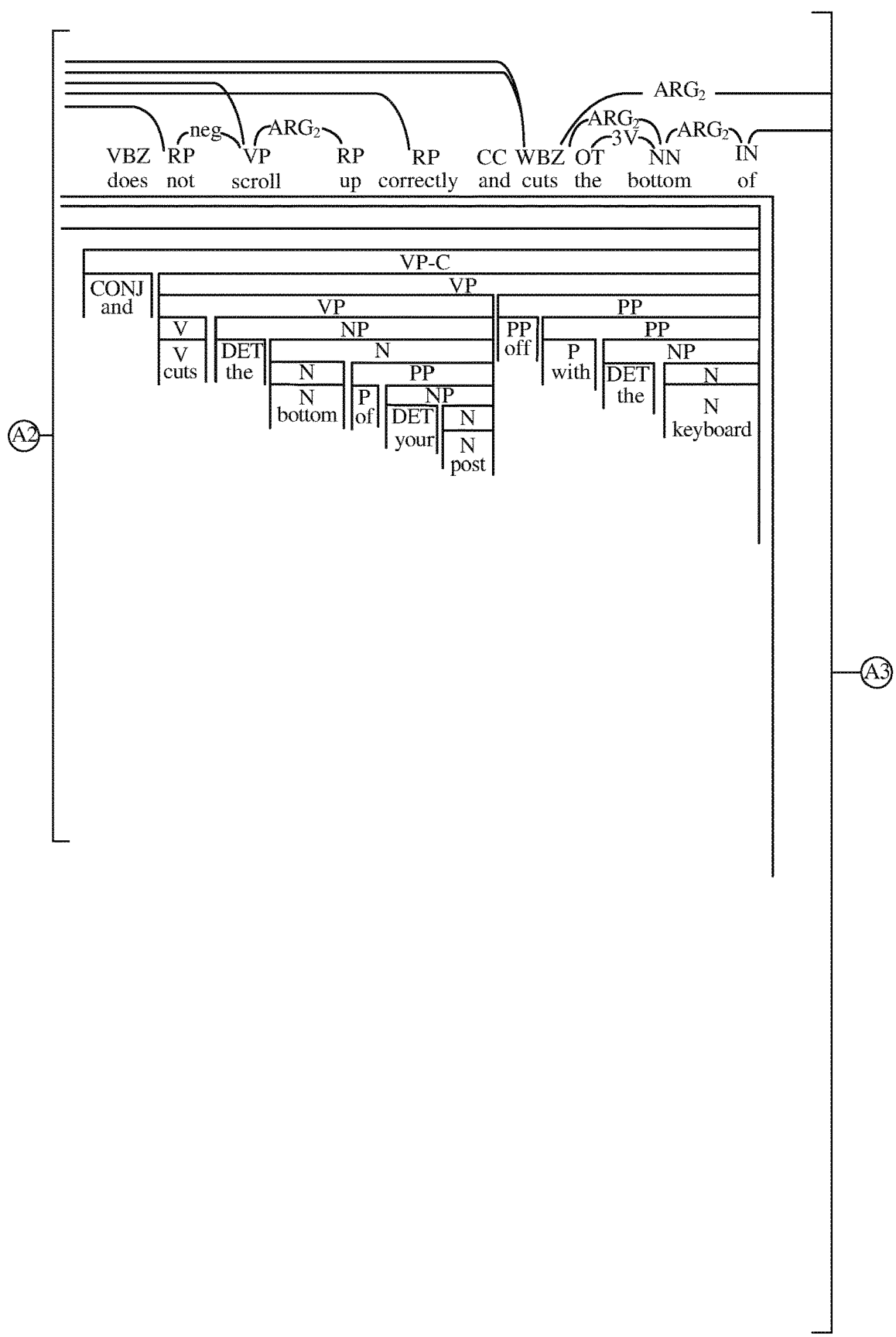
Figure 6D:
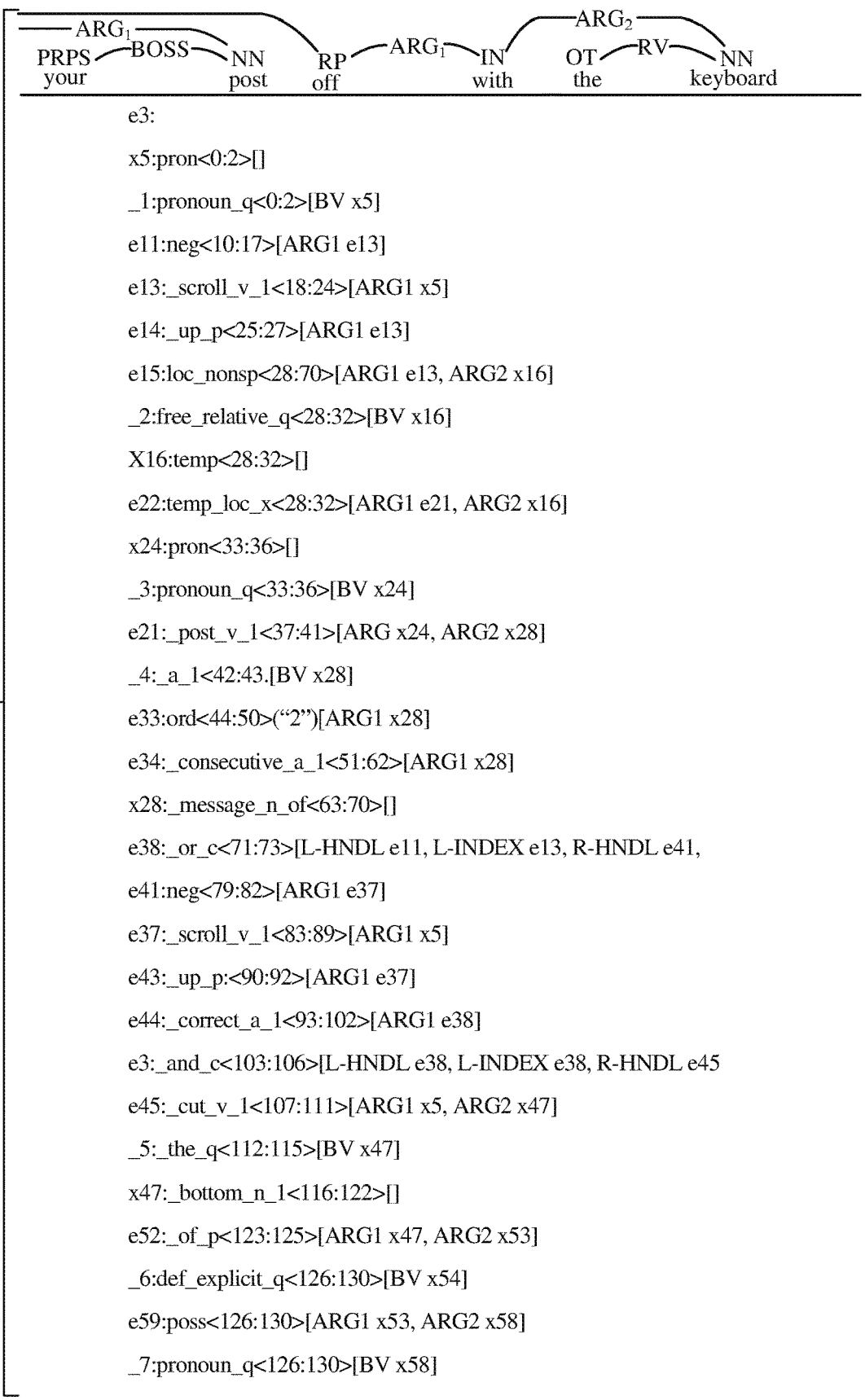
Figure 7A:
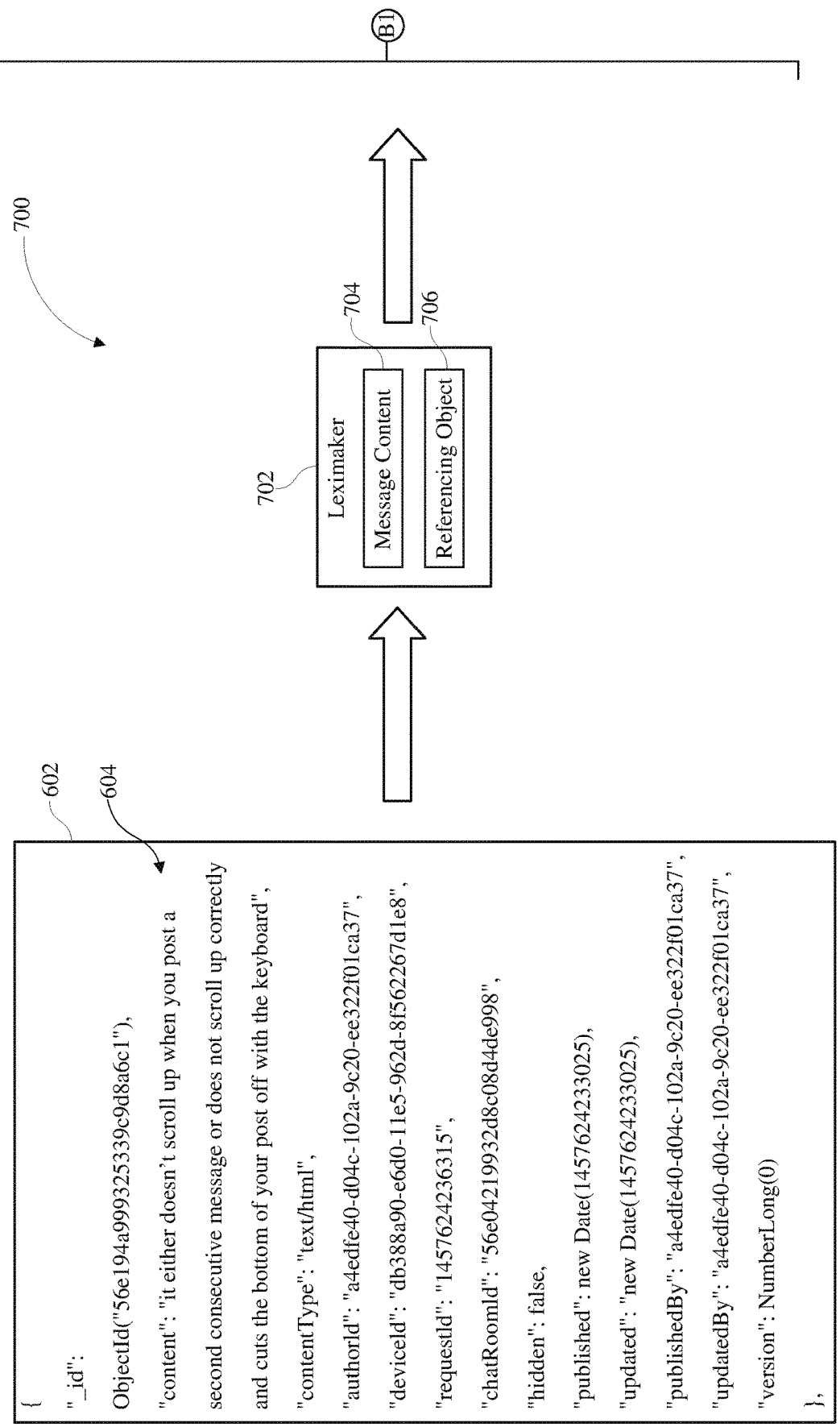
FIGS. 7A-D depict an example of creating a leximarker by a leximarker generator of a chat discourse convolution system according to an embodiment of the present invention.
Figure 7B:
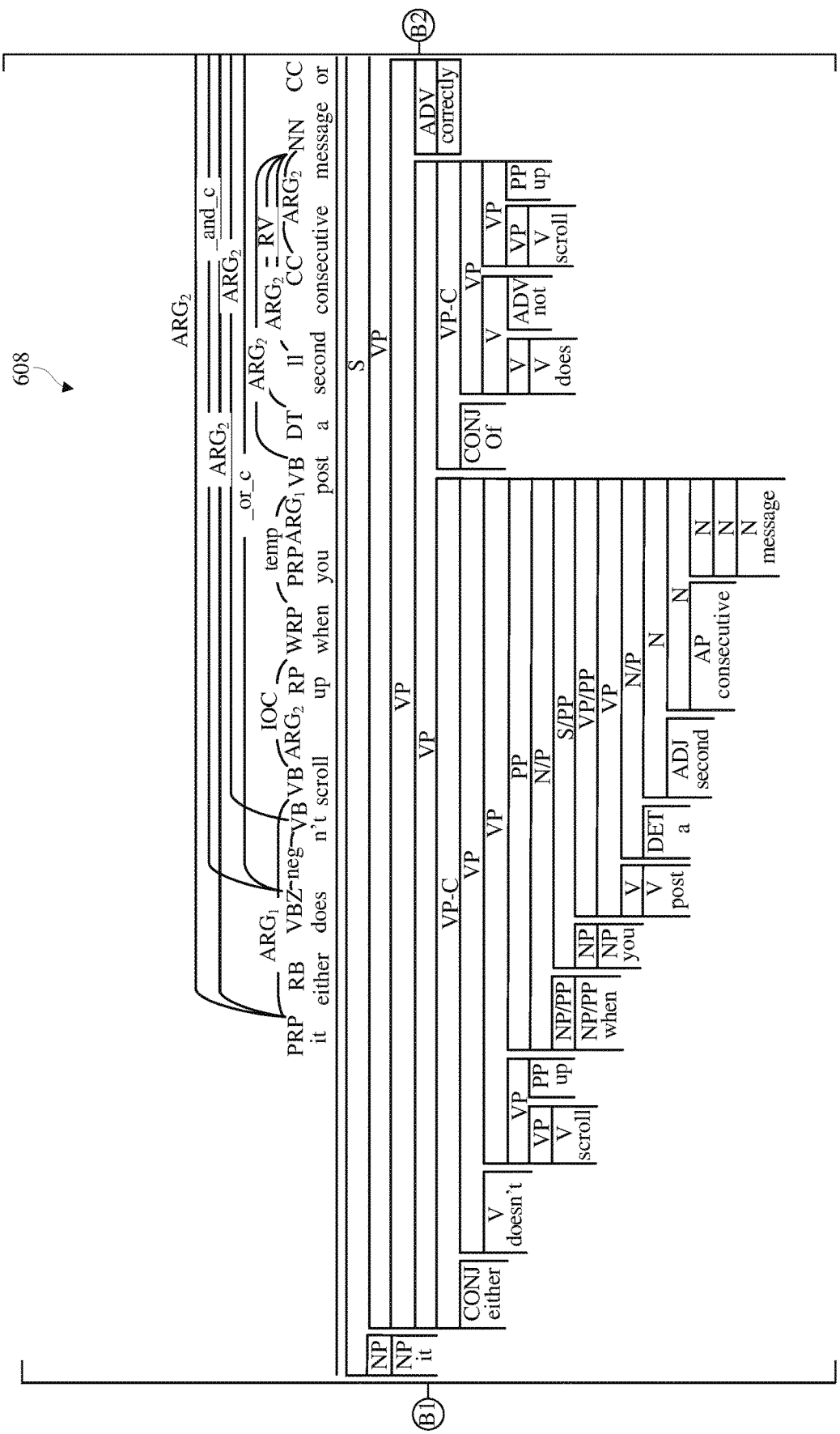
Figure 7C:
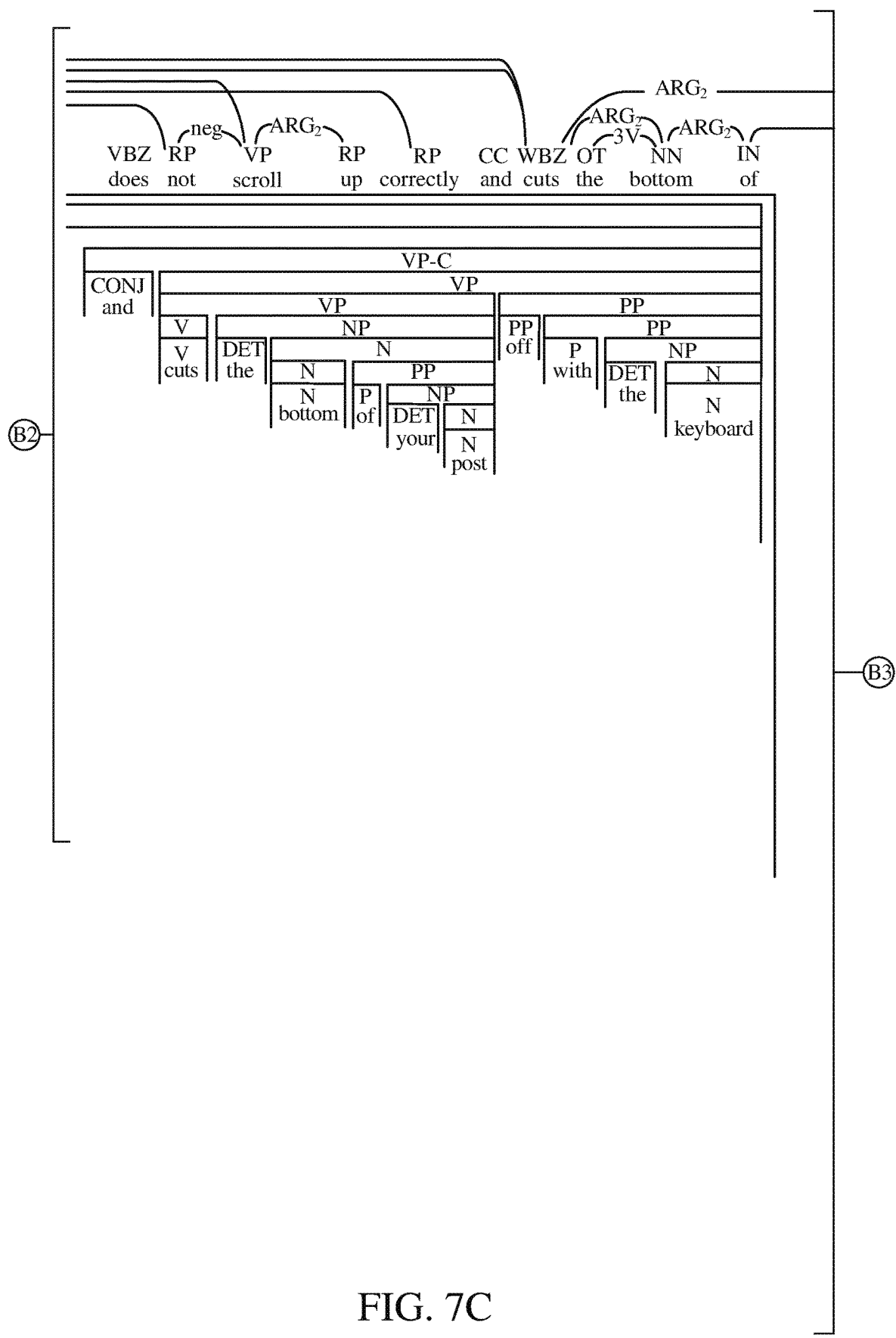
Figure 7D:
Figure 8A:
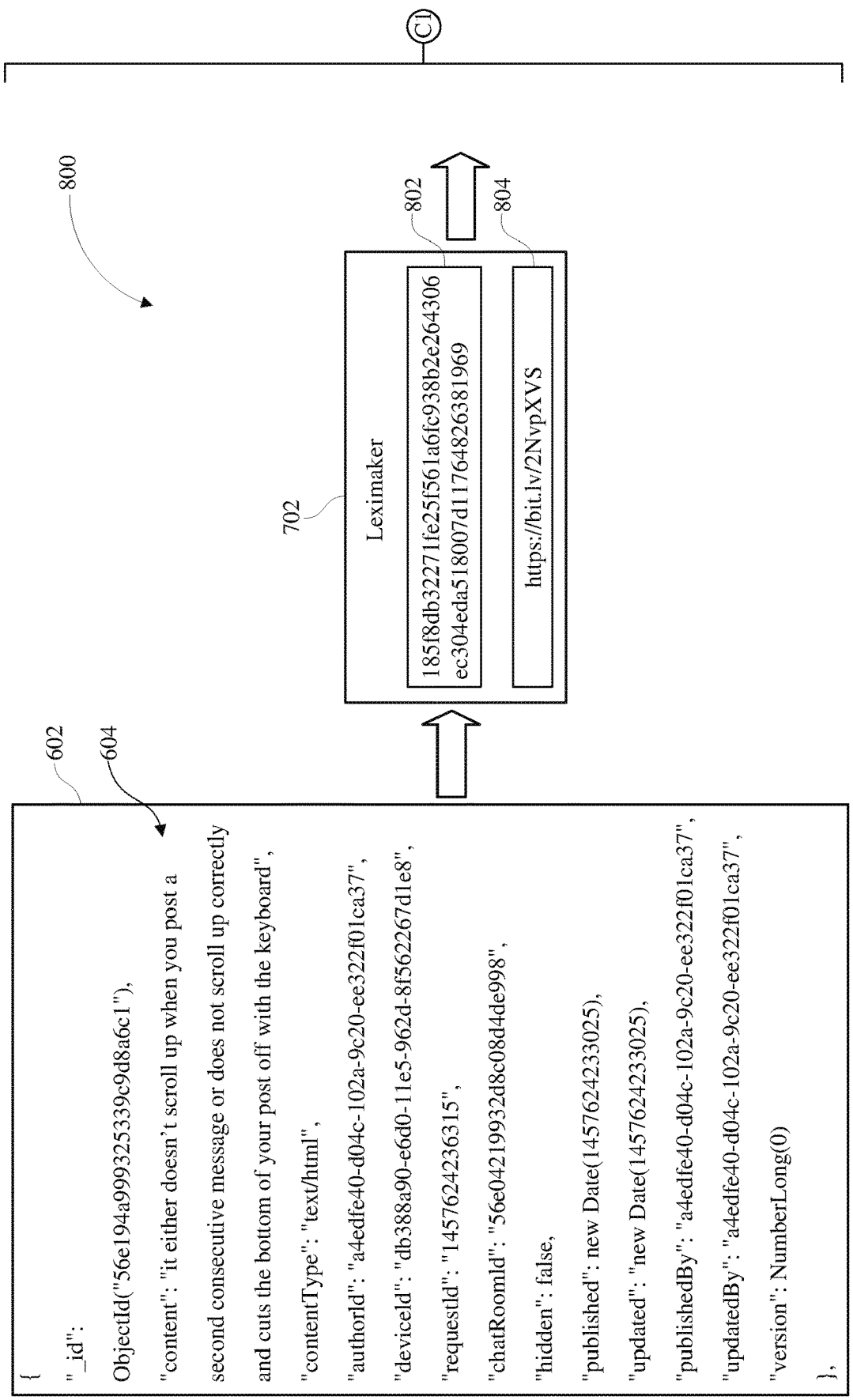
FIGS. 8A-D depict an example of generating a hash of the content of a chat message with a hash generator of a chat discourse convolution system according to an embodiment of the present invention.
Figure 8B:
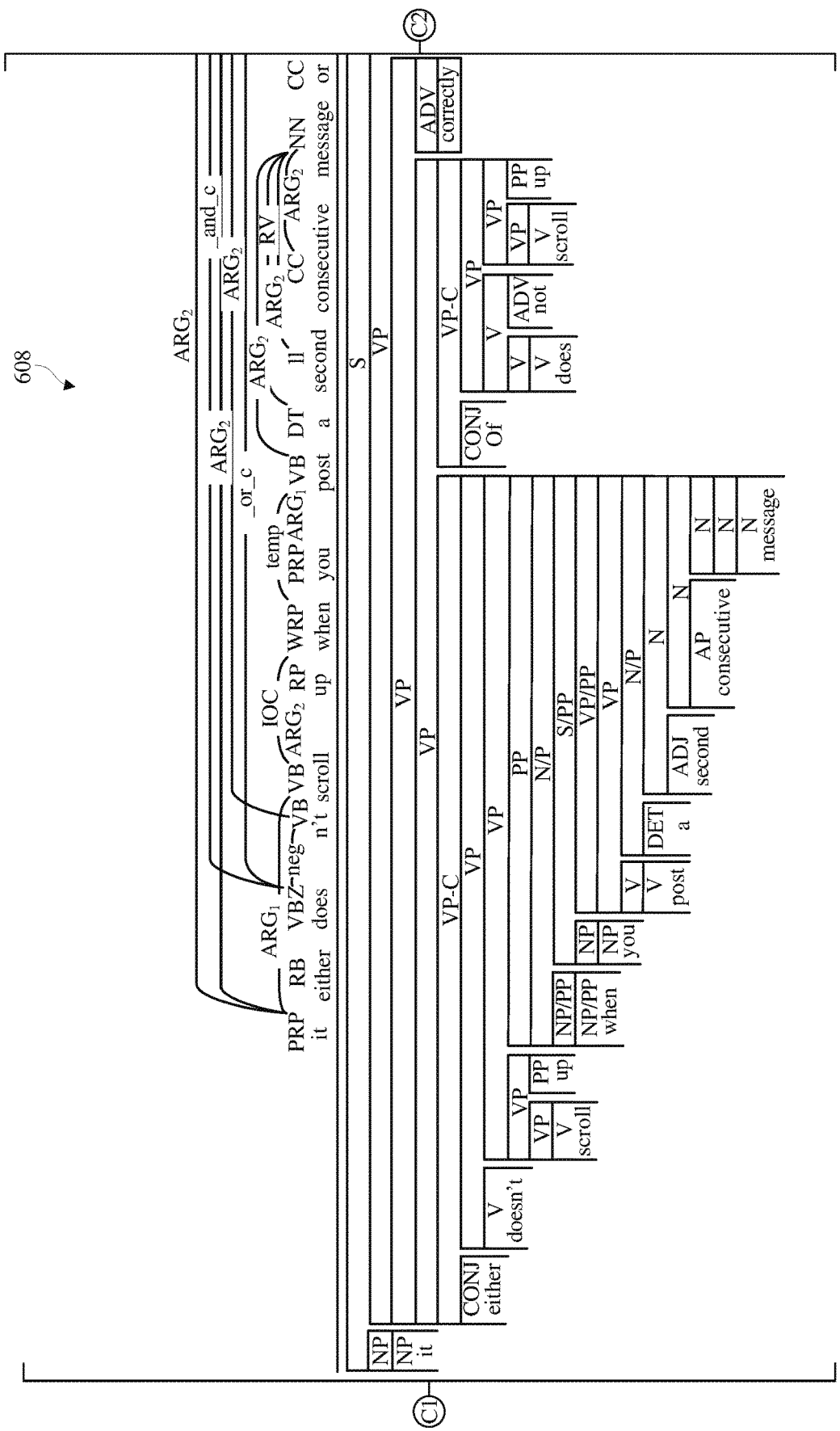
Figure 8C:
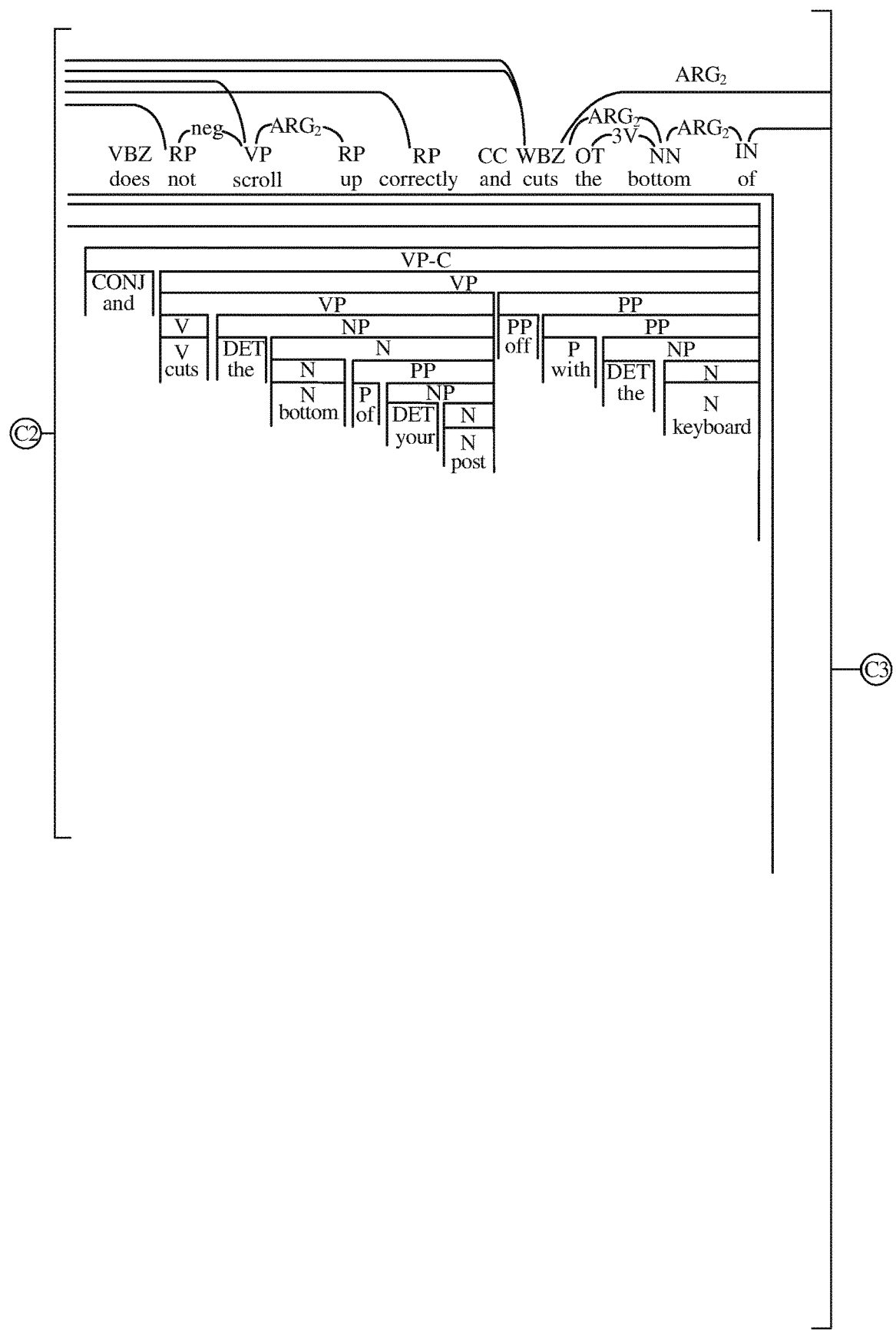
Figure 8D:
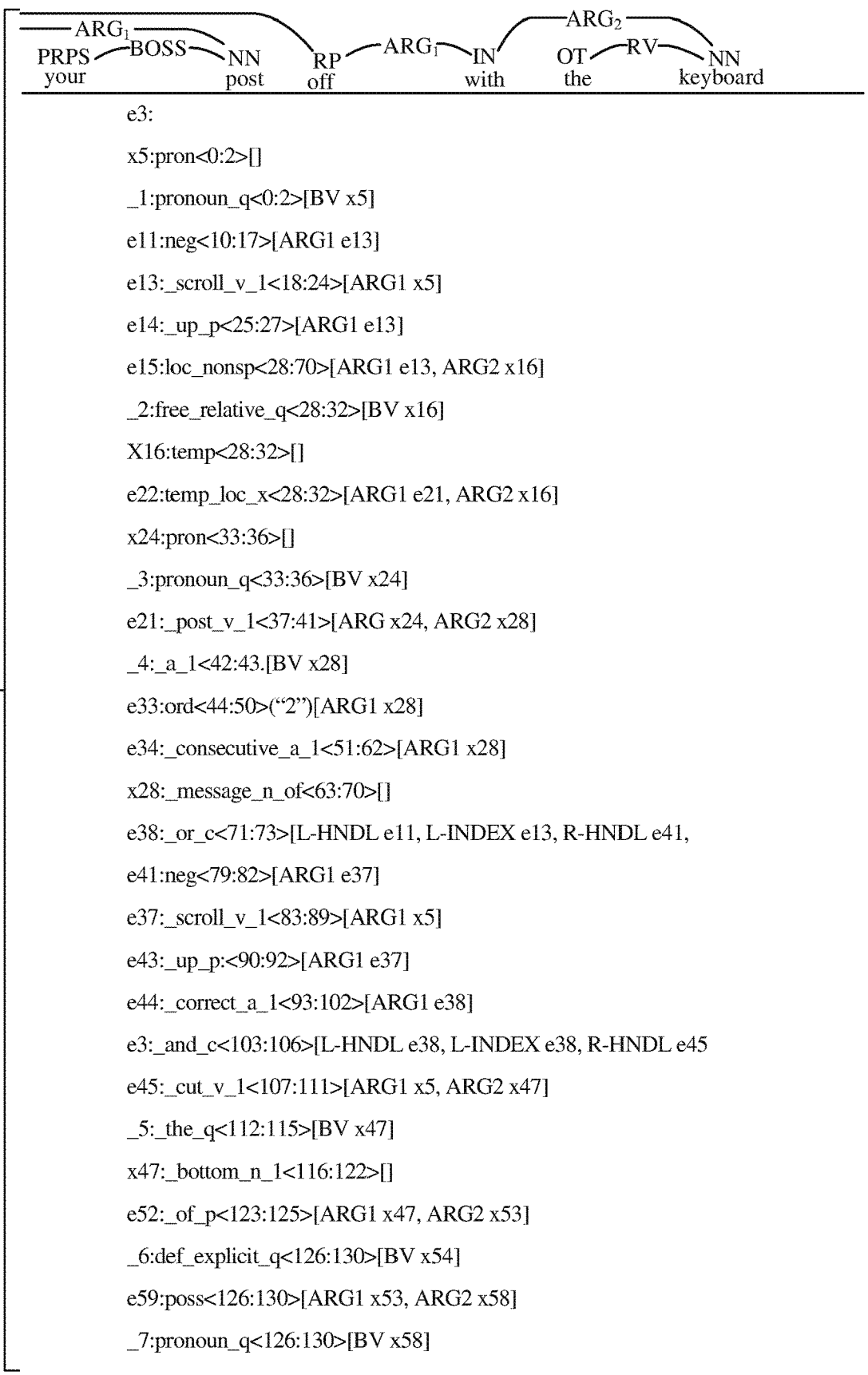

Referring additionally to FIG. 5, certain operative features 500 of system 400, according to one embodiment, are depicted. System 400 receives chat message 502, which is part of a sequence of real-time chats that comprise an original, unmodified chat discourse. At 504, lexicographic analyzer 410 lexicographically analyses the content of chat message 502, the analysis producing lexicographic results 506 (that is, the results of the lexicographic analysis), which are subsequently stored in lexicographic analysis database 416. Lexicographic analyzer 410 also generates referencing object 508, which may be a link to the database location in which lexicographic results 506 are electronically stored. Referencing object 508 is conveyed by lexicographic analyzer 410 to leximarker generator 414. At 510, hash generator 412 generates a hash 512 of the content of chat message 502 and conveys the hash to leximarker generator 414. Leximarker generator 414, at 514, generates leximarker 516. Leximarker 516 contains referencing object 508 and the hash 512 of the content of chat message 502.

A modified version of the chat message can be generated at 518 by replacing the content of chat message 502 with leximarker 516. The resulting modified version 520 of chat message 502 can be added to any similarly modified chat messages of the chat discourse and electronically stored in chat discourse database 418. Optionally, the original, unmodified version of chat message 502 can be electronically stored in original chat discourse database 522.

Referring additionally to FIGS. 6A-D, an example 600 of lexicographic analysis performed by lexicographic analyzer 410 of system 400 is depicted. Illustratively, chat message 602 contains content 604. Chat message 602 is received by system 400 and lexicographic analysis 606 is performed with respect to the content 604 by lexicographic analyzer 410, the analysis yielding lexicographic results 608. Lexicographic analysis 606 can determine, for example, noun/adjective/verb order, collocation patterns, and/or verb tenses or generate other lexicographic results. In other embodiments, natural language processing (NLP) can be used, additionally or alternatively, to analyze representative chat message 602. Lexicographic results 608 can be stored in lexicographic analysis database 416.

Referring additionally to FIGS. 7A-D, an example 700 of generating a leximarker by leximarker generator 414 is depicted. Leximarker 702 is generated by leximarker generator 414 with respect to chat message 602. Leximarker 702 encapsulates referencing object 706, which serves as a referring connection to lexicographic results 608, which, as noted, can be stored electronically in lexicographic analysis database 416. Optionally, message content 704 of chat message 602 can also be contained within leximarker 702 in an unmodified form and subsequently replaced by a hash of the content of chat message 602 to generate a modified version of the chat message.

Referring additionally to FIGS. 8A-D, an example 800 of generating a hash by hash generator 412 is depicted. Hash 802 is generated by hash generator 412 with respect to message content 604 of representative chat message 602. Hash 802 replaces message content 704 in leximarker 702. Optionally, as illustrated, a representational state transfer (REST) application program interface (API) can be used to link chat message 602 to lexicographic results 608, stored electronically, with a uniform resource locator (URL), Rest URL 804, in place of referencing object 706.

Figure 9:
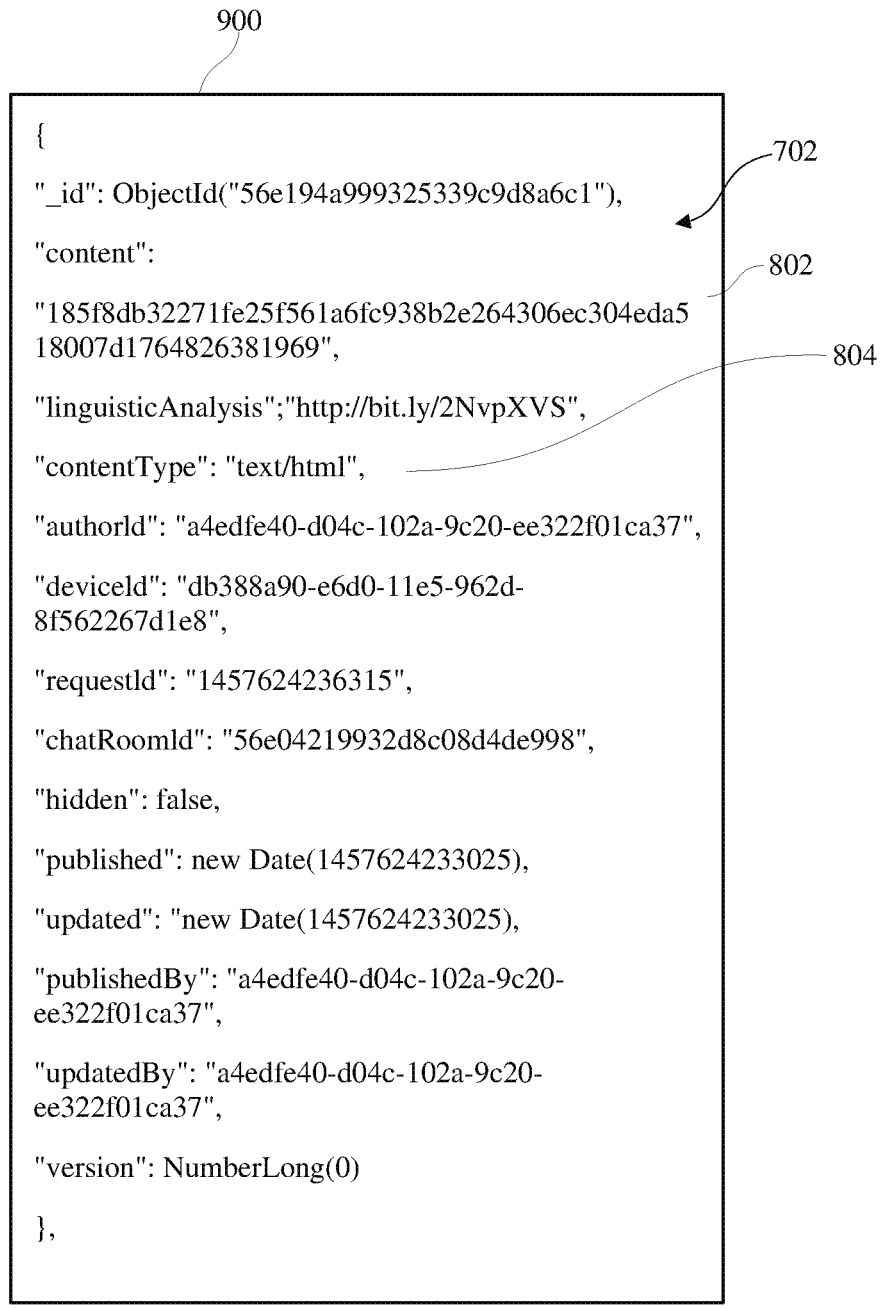
FIG. 9 depicts an example modified version of a chat message, the modified version containing a leximarker generated by a leximarker generator of a chat discourse convolution system according to an embodiment of the present invention
Figure 10A:
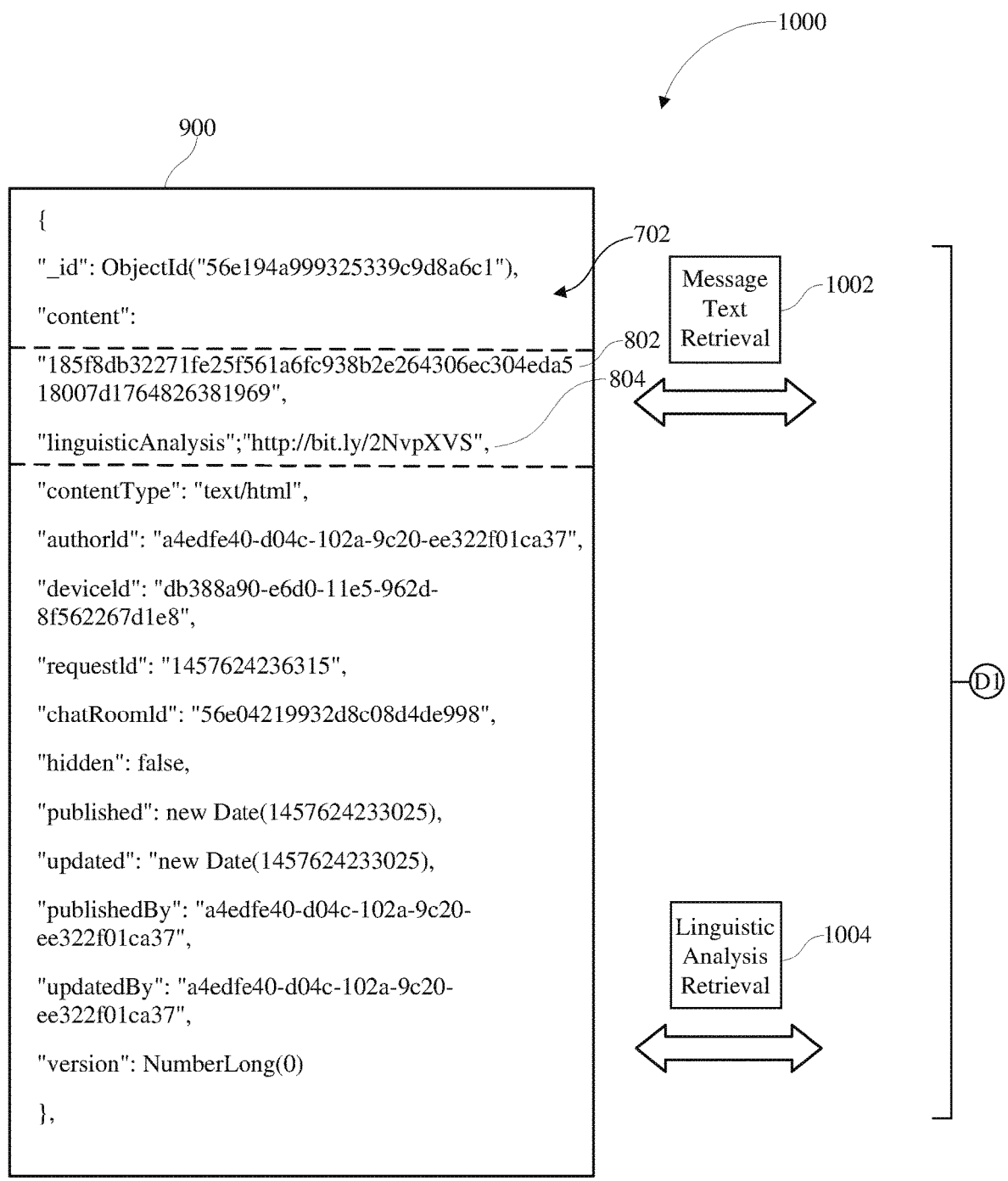
FIGS. 10A-D depict an example use of a leximarker to expand the hashed content of a chat message and to retrieve a stored linguistic analysis of the content of the chat message according to an embodiment of the present invention.
Figure 10B:
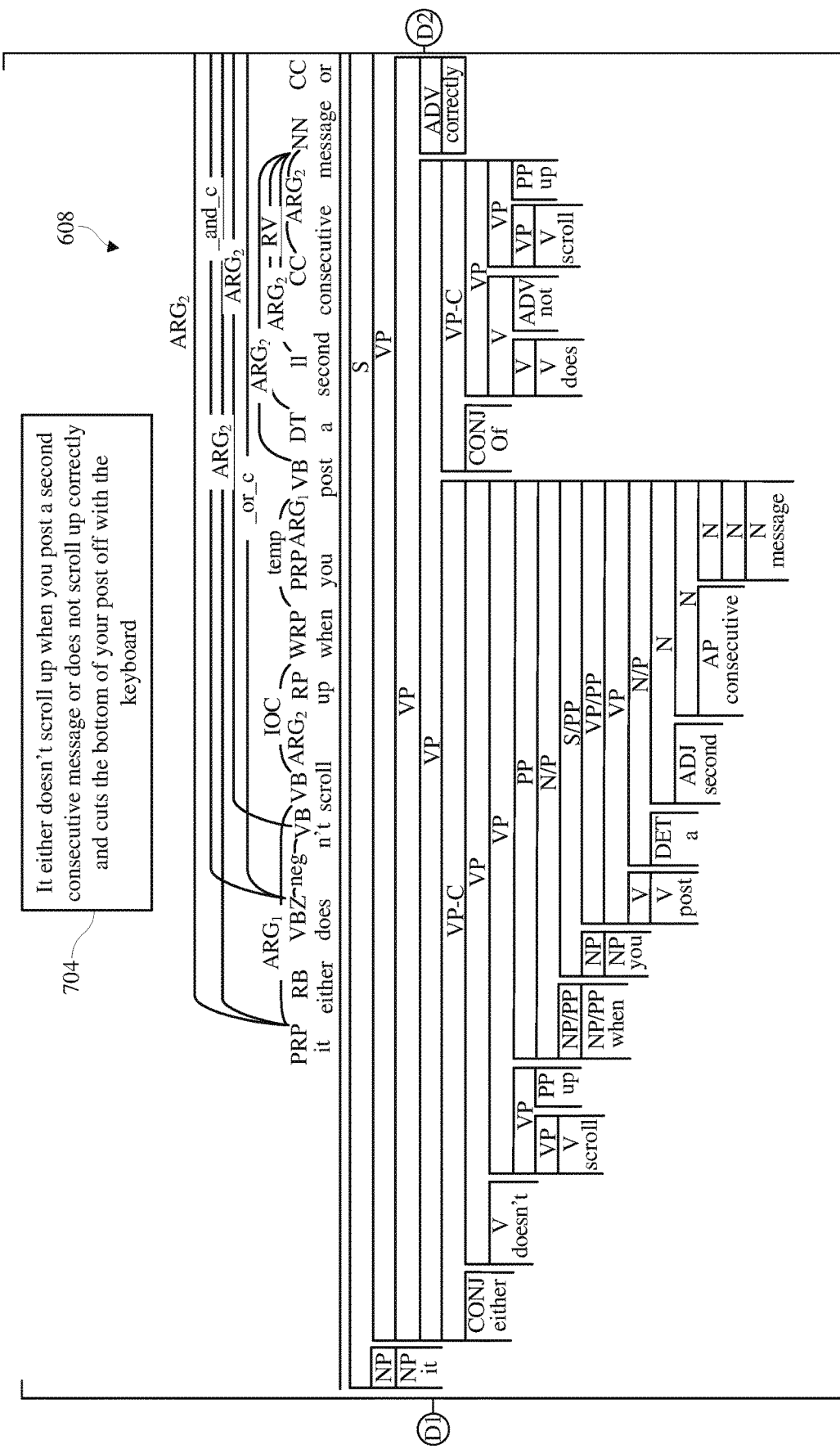
Figure 10C:
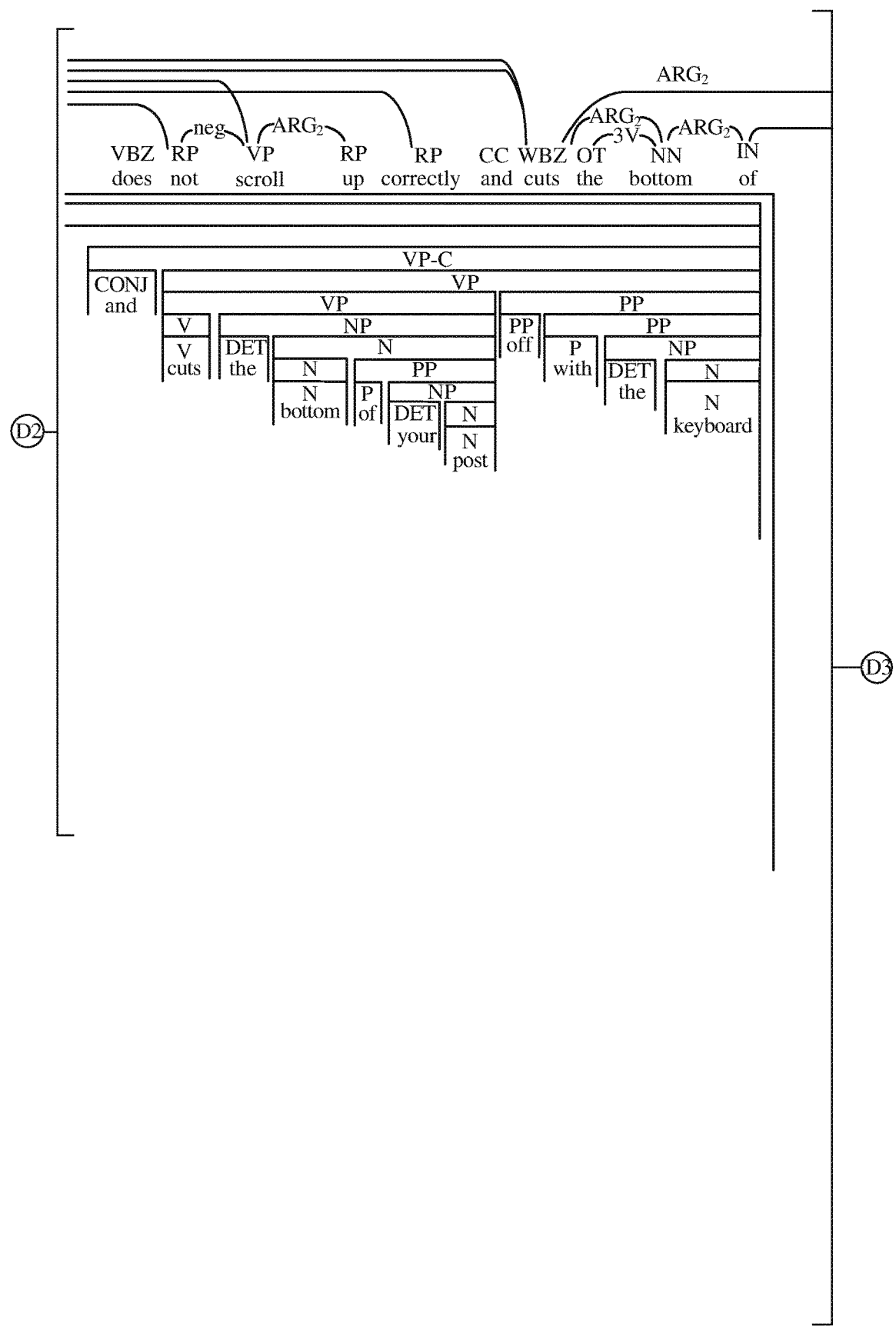
Figure 10D:
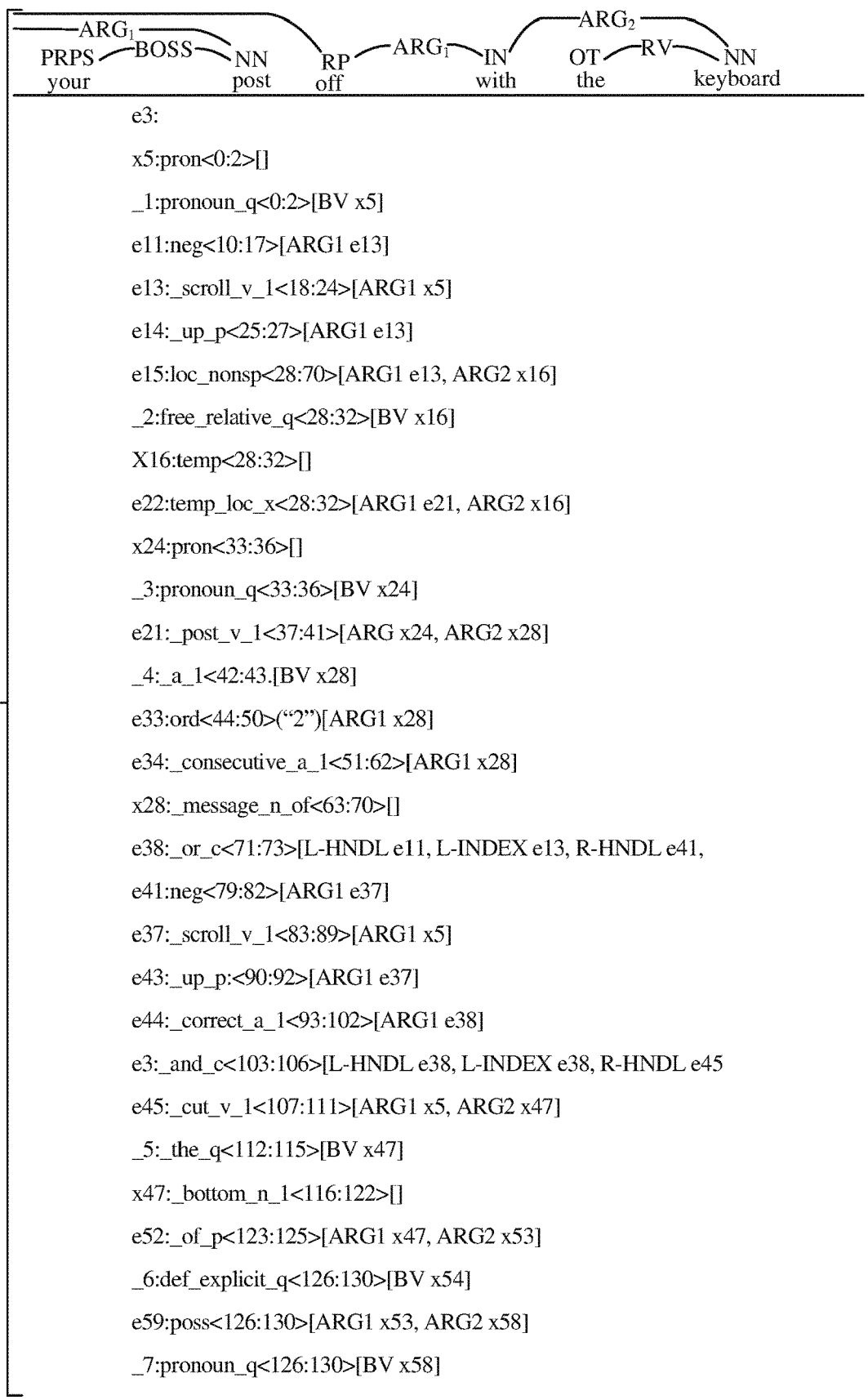

FIG. 9 depicts a modified version 900 of chat message 602 of FIG. 8. Modified version 900 of the chat message is created by replacing the content (604 in FIG. 8) of the chat message with leximarker 702. The replacing of the content with leximarker 702 substitutes hash 802 and Rest URL 804 for the original content. In the context of this representative example, a 157-character message has been reduced to a 64-character hash and 22-character Rest URL for a combined total of 88 characters, which represents a net reduction of 69 characters.

The leximarker of a chat discourse convolution is a distinct lexicographical characteristic corresponding to specific message content. The leximarker thus uniquely defines a chat message. In a single chat discourse, the same phrase and/or expression may be repeated in several separate messages during the chat discourse. With chat discourse convolution, each of the multiple messages that contains the same phrases or expressions is represented by the same leximarker. Only the single leximarker and one copy of the corresponding messages comprising the repeat phrases or expressions need be saved and stored electronically. Each message, expression, or phrase that merely repeats another can be discarded.

Moreover, what is true for a single chat discourse is true in the aggregate for an archive of multiple chat discourses. In each, there likely are messages that comprise the same phrases or expressions in one or more other chat discourses. With chat discourse convolution, each such message corresponds to a single, identical leximarker, enabling even greater reductions in memory usage for archiving chat discourses. The conversational nature of real-time chats makes the repetition of expressions and phrases all the more likely, thereby increasing the chat discourse convolution system's capacity for reducing memory storage. In one embodiment, a system for chat discourse convolution such as system 400 can effect further reductions by removing from chat messages certain so-called "stock words," words that can be ignored (and hence removed) without making a message less comprehensible.

The advantages gained with chat discourse convolution extend beyond reductions in memory usage for archiving chat discourses. Reducing multiple, repeat phrases and expressions to a singleton, as well as removal of stock words, can also enhance the effectiveness and efficiency of certain machine-based analyses of such archives. Creating a singleton that is representative of multiple occurrences can increase the speed and efficiency with which a machine can carry out the analysis of archived chat discourses. Corpus linguistic analysis inferences, for example, can be made on hashed text using a leximarker as contextual data, one benefit being that duplicate messages are stored once rather than multiple times in multiple locations.

A leximarker adds context to an analysis of a hashed chat message. Moreover, as needed depending on the nature of the analysis, the hashed chat message can be expanded back to the chat message's original, unmodified form. The hashed chat message is expanded using the leximarker, which links the hash of the message content to the original text of the chat message. The leximarker also enables retrieval of the linguistic analysis using the referencing object also contained in the leximarker. Only one copy of the chat message is saved and stored electronically. If the chat message is repeated over subsequent chat discourses, there is no need to save an additional copy and new hash. To retrieve the one copy, a one-way hash can be used in conjunction with a lookup table, thereby providing a secure mechanism for reversal of the hash. Alternatively, a two-way hash can be utilized for hash-to-message reversal.

FIGS. 10A-D depict an example 1000 of using a leximarker to expand the hashed content of modified version 900 of the chat message in FIG. 9 and to retrieve the stored linguistic analysis of the message content. Modified version 900 of the chat message contains leximarker 702, which replaced the original text of the message. Leximarker 702 encapsulates hash 802 and Rest URL 804. Message text retrieval 1002 uses hash 802 to retrieve the text of message content 704, which optionally can be electronically stored in a separate database. Linguistic analysis retrieval 1004 uses Rest URL 804 to retrieve lexicographic results 608. In one embodiment, hash 802 is a one-way hash that is used in conjunction with a lookup table. In another embodiment, hash 802 is a two-way hash.

Figure 11:
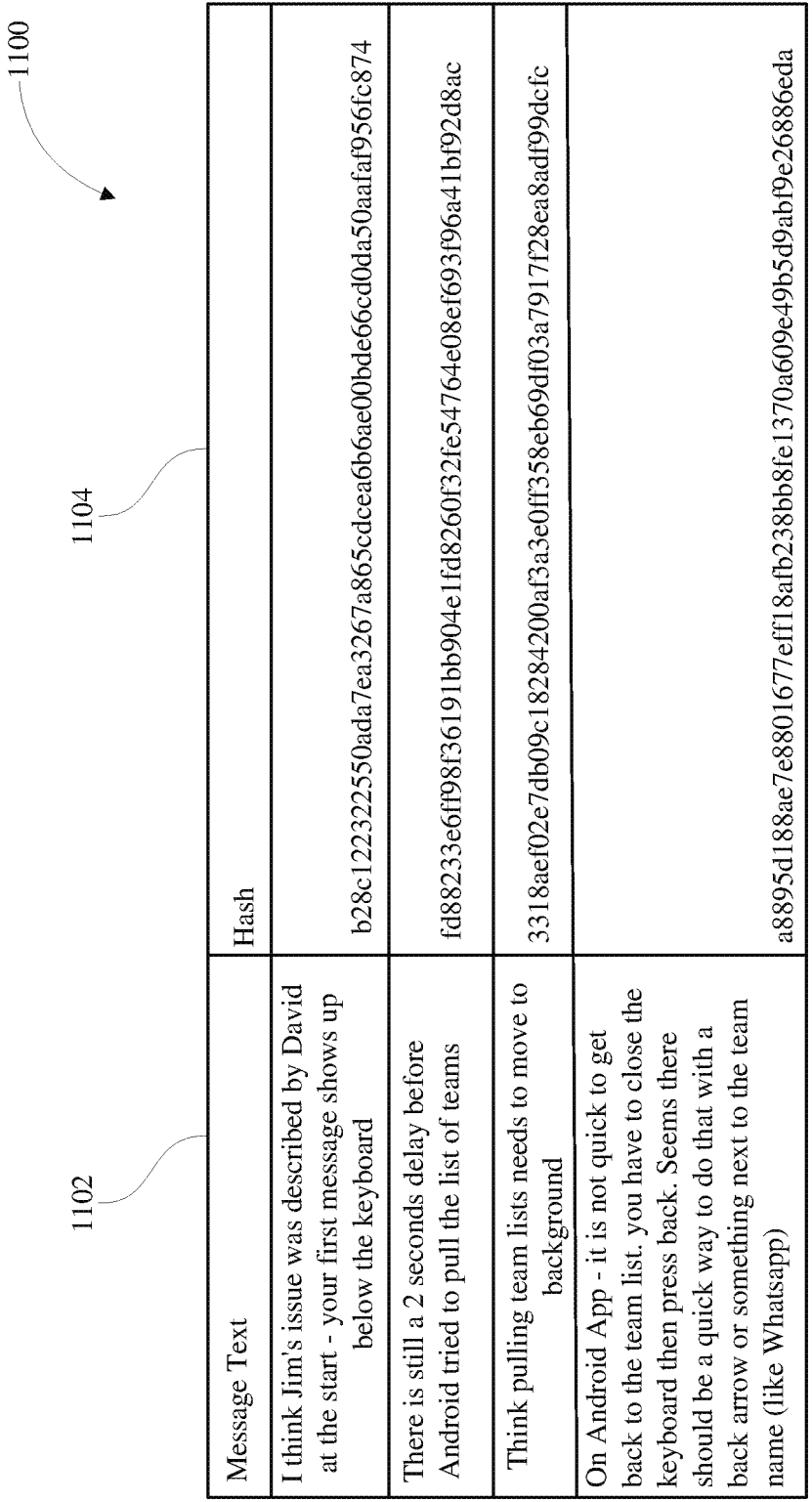
FIG. 11 depicts an example lookup table used in conjunction with a one-way hash function by a chat discourse convolution system according to one embodiment of the present invention.
Figure 12:
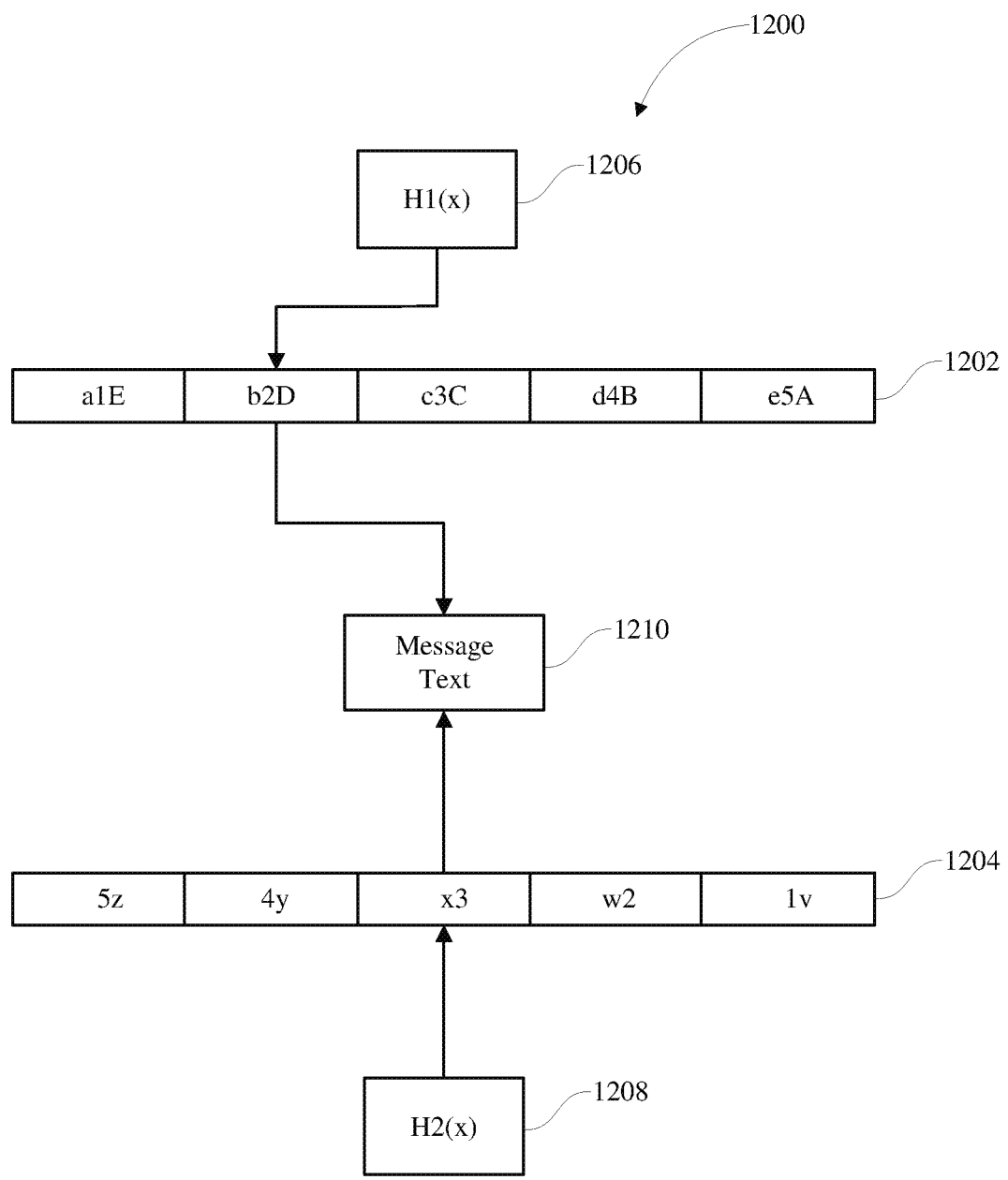
FIG. 12 depicts an example two-way hash comprising separate structures and hash functions used by a chat discourse convolution system according to one embodiment of the present invention.

FIG. 11 depicts example lookup table 1100 as comprising multiple message texts 1102, the multiple message texts identified by corresponding hashes 1104. FIG. 12 depicts a hypothetical two-way hash 1200 that comprises structures 1202 and 1204 with corresponding hash functions 1206 and 1208, respectively. Structures 1202 and 1204 share the same data set, namely message texts, only one of which—message text 1210—is explicitly shown. Structures 1202 and 1204 can be completely independent, and corresponding hash functions 1206 and 1208 can be tailored to meet unique requirements of each.

In one embodiment, a chat discourse convolution system such as system 400 can also monitor which hashes of which chat messages processed over time are expanded (e.g., original text message retrieved from a chat discourse archive using a leximarker) for purposes of content analysis. Based on the observations, the chat discourse convolution system can model the results for predicting with a certain level of significance which hashed text-leximarker combinations are more likely than others to be expanded during future analyses. The modeling, in some embodiments, can use standard statistical techniques (e.g., linear regression, quadratic regression, polynomial regression). In other embodiments, the modeling can use machine learning either to classify each hashed text-leximarker combination (e.g., more likely to be expanded or less likely) or to predict whether a particular combination will be expanded. Based on such modeling, the chat discourse system can determine a likelihood score that an analyst or other system user analyzing a chat discourse will reference back to the original text of a chat message after the chat message has been hashed and added to a leximarker.

Using the likelihood score, the chat discourse convolution system determines the level of compression (amount of hashing) to be applied in hashing a chat message when initially creating a leximarker corresponding to the chat message. The chat discourse convolution system can select a hash technique for generating the hash based on the likelihood that the hash of the content of the chat message will be expanded for use in a future analysis of the message content. For lower likelihood scores more lossy hash techniques are selected, and conversely, for higher likelihood scores less lossy hash techniques are selected by the system.

In another embodiment, the extent to which a particular chat message's content is hashed by the chat discourse convolution system can be based on a leximarker contextual threshold. The leximarker contextual threshold can be determined based on various different considerations of the message content and the nature of the data expected to be extracted from the message content in subsequent analyses. These considerations include the data uniqueness and word usage patterns within the chat discourse. With respect to data size and system- or memory-space considerations, a high level of reduction in terms of the ratio of character count from chat message to hashed text can be achieve by the system using, for example, a 256 bit hash ($2^{256}$) or a 32 bit hash ($2^{32}$).

In application, message content that does not meet the threshold receives greater hashing than message content that meets or exceeds the threshold. The threshold reflects the fact that greater hashing roughly translates into coarser data—that is less depth of meaning or nuance than in the original message content. Accordingly, the leximarker contextual threshold can safeguard against coarsening data that, depending on various considerations (e.g., data uniqueness and usage patterns), should be preserved in or near to the data's original granularity. Data granularity requirements, however, can vary depending on the type and context of the analysis. The leximarker contextual threshold can be set based on a sliding scale that adjusts depending on the type and context of the analysis expected to be performed on the underlying chat message. Based on the criteria described, each chat message can be assigned a leximarker contextual value and the amount of hashing of the chat message can be determined by comparing the leximarker contextual value of the chat message with the leximarker contextual threshold.

In still another embodiment, a hash technique for generating the hash can be selected from a set in which the size of the hash varies. The size of the hash can be based on a text length of the chat message and an expected amount of lexicographical information to be extracted from the chat message. The system can determine the size of the chat messages and based on the determination can use a specific hash size (e.g., 32-bit, 64-bit, 128-bit, and so forth). The larger the hash sizes, the less the chance of different chat messages corresponding to the same hash (hash collision). The system can also determine the size of chat discourse corpora (or archives) and use a larger hash size the larger the corpora of chat message texts.

Figure 13:
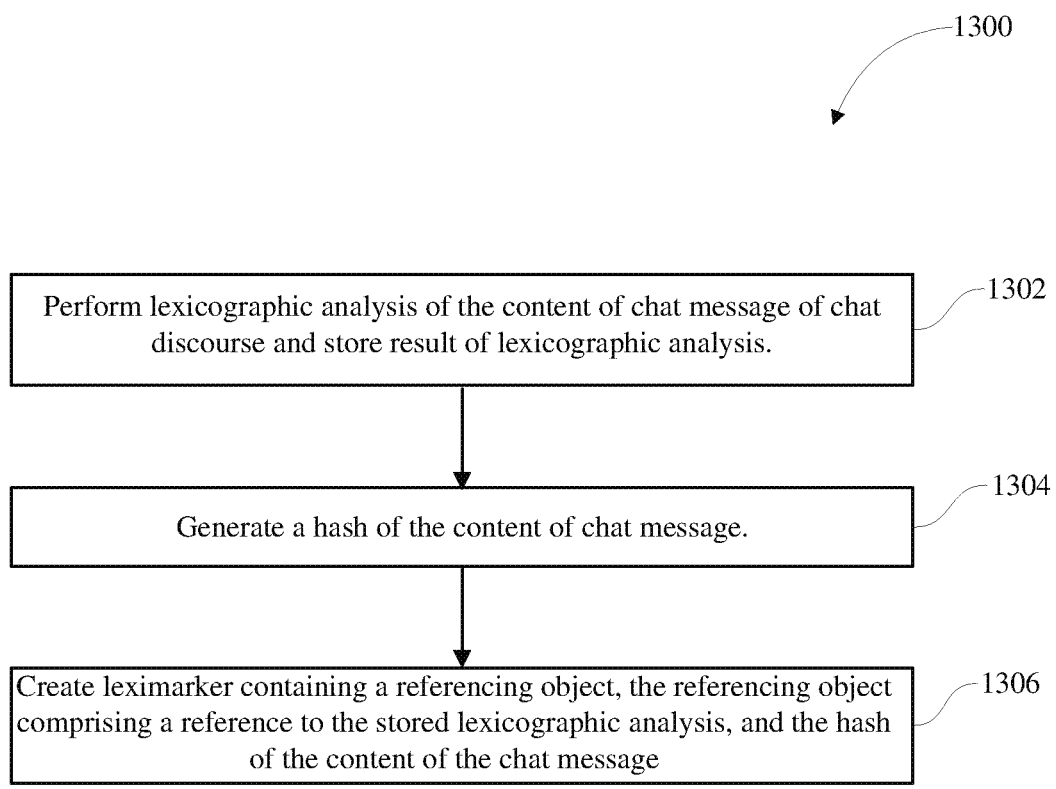
FIG. 13 is a flowchart of a method of creating a chat discourse convolution leximarker according to one embodiment of the present invention.

FIG. 13 is a flowchart of method 1300 for creating a leximarker according to one embodiment. Method 1300 can be performed by a system the same as or similar to the systems described in connection with FIGS. 1-12. The method can begin with the system receiving a chat message of a chat discourse via a data communications network. At 1302, the system performs a lexicographic analysis of the content of a chat message of a chat discourse and stores the result of the lexicographic analysis in a database. The system generates a hash of the content of the chat message at 1304. A leximarker is created at 1306, the leximarker comprising a reference to the stored results of the lexicographic analysis and the hash of the content of the chat message.

The system optionally selects a hash technique for generating the hash based on a likelihood that the hash of the content of the chat message will be expanded for use in content analysis. As described above, the likelihood can be determined by the system observing which hashes of other processed chat messages have been expanded for purposes of content analysis.

Using the observations, the system can model the results for predicting with a predetermined level of significance which hashed text-leximarker combinations are more likely than others to be expanded during future analyses. In certain embodiments, the system uses standard statistical techniques (e.g., multivariate regression analysis). In other embodiments, the system uses machine learning to either to classify each hashed text-leximarker combination (e.g., likely to be expanded or no) or to predict whether a particular combination will be expanded. The system, based on the modeling, can determine a likelihood score that a system user in analyzing a chat discourse will reference back to the original text of a chat message after the chat message has been hashed and added to a leximarker. Using the likelihood score, the system determines a level of compression (amount of hashing) to be applied in hashing a chat message when initially creating a leximarker. The system thus can select a hash technique for generating the hash based on the likelihood that the hash of the content of the chat message will be expanded during an analysis of the message content.

In another embodiment, method 1300 can include the system selecting a hash technique for generating the hash wherein a size of the hash varies. The size of the hash can vary based on a text length of the chat message and an expected amount of lexicographical information to be extracted from the chat message.

In yet another embodiment, method 1300 can include the system determining the amount of hashing of the content of a chat message based on a leximarker contextual threshold. The leximarker contextual threshold can be determined based on various considerations (e.g., data uniqueness and usage patterns) of the message content and the nature of the data expected to be extracted from the message content in subsequent analyses. In a specific embodiment, the leximarker contextual threshold can be set based on a sliding scale that adjusts depending on the type and context of the analysis expected to be performed on the underlying chat message. Each chat message can be assigned a leximarker contextual value based on predetermined criteria, and the amount of hashing of the chat message can be determined by comparing the leximarker contextual value of the chat message with the leximarker contextual threshold.

Figure 14:
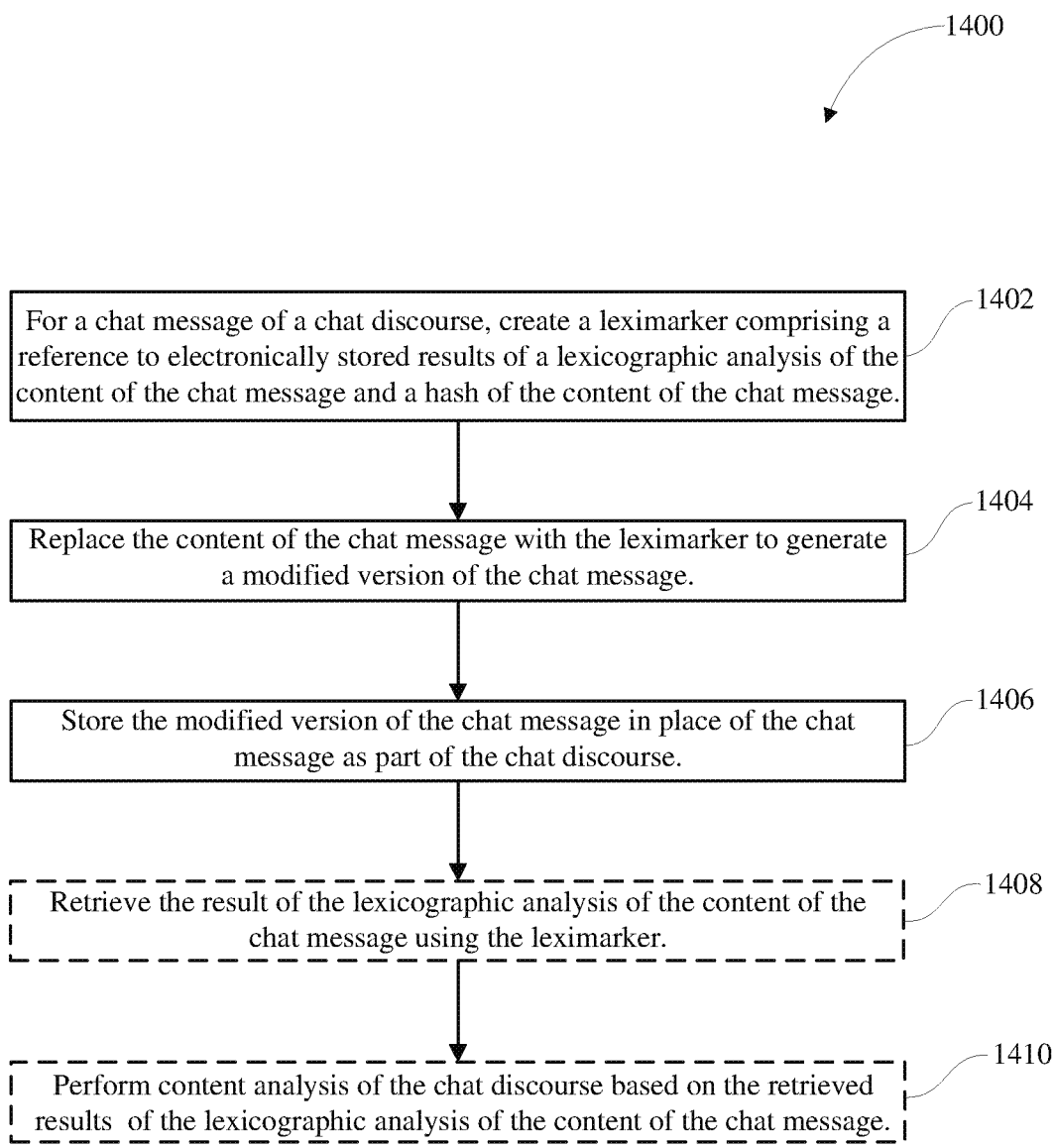
FIG. 14 is a flowchart of a method of generating a modified version of a chat message using a leximarker and optionally performing content analysis of a chat discourse using the leximarker according to one embodiment of the present invention.

FIG. 14 is a flowchart of method 1400 for using a leximarker to create a modified version of a chat message according to one embodiment. Method 1400 also can be performed by a system the same as or similar to the systems described in connection with FIGS. 1-12. The method can begin with the system receiving a chat message of a chat discourse. The system at 1402 creates a leximarker comprising a reference to the results of a lexicographic analysis of the content of the chat message and a hash of the content of the chat message. The system generates a modified version of the chat message at 1404 by replacing the content of the chat message with the leximarker created at 1402. The system electronically stores the modified version of the chat message in place of the chat message as part of the chat discourse at 1406.

Optionally, method 1400 can also include retrieving the electronically stored results of the lexicographic analysis at 1408 by accessing the database location of the stored results using the reference contained in the leximarker. Method 1400 can further include performing a content analysis of the chat discourse at 1410, the content analysis based on the retrieved results of the lexicographic analysis of the chat message. The content analysis of the chat discourse is optionally performed without expanding the hash of the content of the chat message to obtain the original content of the chat message. If, however, the analysis is enhanced by access to the underlying text of the chat message, then the leximarker can be expanded using either a one-way hash and lookup table that links the hash to the message text or using by using a two-way hash, as described above.

These methods can be implemented as a computer program product at any possible technical detail level of integration. The computer program product can include a computer readable storage medium (or media) having computer readable program code stored therein, the program code executable by computer hardware to initiate operations including those described herein.

The computer readable storage medium can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform the operations described herein.

Certain embodiments described herein are described with reference to flowchart illustrations and/or block diagrams of methods, apparatus (systems), and computer program products. It is expressly noted and is to be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In certain other implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose, hardware-based systems that perform the specified functions or acts or carry out combinations of special purpose hardware and computer instructions.

FIGS. 1-14 are conceptual illustrations allowing for a full explanation of the embodiments described. Notably, the figures and examples above are not meant to limit the scope of the disclosure to a single embodiment, as other embodiments are possible by way of interchange of some or all of the described or illustrated elements. Moreover, where certain elements can be partially or fully implemented using known components, only those portions of such known components that are necessary for an understanding of the disclosure are described, and detailed descriptions of other portions of such known components are omitted so as not to obscure the described embodiments. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the disclosure encompasses present and future known equivalents to the known components referred to herein by way of illustration.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

That which is claimed is:

1. A method, comprising:
 performing, with a computer, a lexicographic analysis of content of a chat message of a chat discourse and storing a result of the lexicographic analysis in a database;
 selecting a hash technique for generating a hash of the content of the chat message based on a likelihood that the hash of the content of the chat message will be expanded for use in content analysis, wherein the hash technique is performed using machine learning and the likelihood that the hash of the content of the chat message will be expanded for use in content analysis is determined by monitoring which hashes of other processed chat messages have been expanded for purposes of content analysis;
 generating the hash of the content of the chat message using the selected hash technique;
 creating a leximarker comprising the hash of the content of the chat message and a reference to the stored result of the lexicographic analysis;
 generating a modified version of the chat message by replacing the content of the chat message with the leximarker;

electronically storing the modified version of the chat message in place of the chat message as part of the chat discourse; and using the leximarker to retrieve the result of the lexicographic analysis and, based on the retrieved result, performing content analysis of the chat discourse, wherein the content analysis of the chat discourse is performed without expanding the hash of the content of the chat message to obtain the content of the chat message in an original, unmodified form.

2. The method of claim 1, wherein a size of the hash varies based on a text length of the chat message and an expected amount of lexicographical information to be extracted from the chat message.

3. The method of claim 1, wherein the generating the hash comprises determining an amount of hashing of the content of the chat message based on comparing a leximarker contextual value of the chat message with a leximarker contextual threshold.

4. A system, comprising:
a computer having at least one processor programmed to initiate executable operations, the executable operations including:
selecting a hash technique for generating a hash of the content of the chat message based on a likelihood that the hash of the content of the chat message will be expanded for use in content analysis, wherein the hash technique is performed using machine learning and the likelihood that the hash of the content of the chat message will be expanded for use in content analysis is determined by monitoring which hashes of other processed chat messages have been expanded for purposes of content analysis;
generating the hash of the content of the chat message using the selected hash technique;
creating a leximarker comprising the hash of the content of the chat message and a reference to the stored result of the lexicographic analysis;
generating a modified version of the chat message by replacing the content of the chat message with the leximarker;
electronically storing the modified version of the chat message in place of the chat message as part of the chat discourse; and
using the leximarker to retrieve the result of the lexicographic analysis and, based on the retrieved result, performing content analysis of the chat discourse, wherein the content analysis of the chat discourse is performed without expanding the hash of the content of the chat message to obtain the content of the chat message in an original, unmodified form.

5. The system of claim 4, wherein the generating the hash comprises determining an amount of hashing of the content of the chat message based on comparing a leximarker contextual value of the chat message with a leximarker contextual threshold.

6. The system of claim 4, wherein a size of the hash varies based on a text length of the chat message and an expected amount of lexicographical information to be extracted from the chat message.

7. A computer program product, comprising:
a computer-readable storage medium having program code stored thereon, the program code executable by computer hardware to initiate operations including:
performing a lexicographic analysis of content of a chat message of a chat discourse and storing a result of the lexicographic analysis in a database;
selecting a hash technique for generating a hash of the content of the chat message based on a likelihood that the hash of the content of the chat message will be expanded for use in content analysis, wherein the hash technique is performed using machine learning and the likelihood that the hash of the content of the chat message will be expanded for use in content analysis is determined by monitoring which hashes of other processed chat messages have been expanded for purposes of content analysis;
generating the hash of the content of the chat message using the selected hash technique;
creating a leximarker comprising the hash of the content of the chat message and a reference to the stored result of the lexicographic analysis;
generating a modified version of the chat message by replacing the content of the chat message with the leximarker;
electronically storing the modified version of the chat message in place of the chat message as part of the chat discourse; and
using the leximarker to retrieve the result of the lexicographic analysis and, based on the retrieved result, performing content analysis of the chat discourse, wherein the content analysis of the chat discourse is performed without expanding the hash of the content of the chat message to obtain the content of the chat message in an original, unmodified form.

8. The computer program product of claim 7, wherein wherein a size of the hash varies based on a text length of the chat message and an expected amount of lexicographical information to be extracted from the chat message.

9. The computer program product of claim 7, wherein the generating the hash comprises determining an amount of hashing of the content of the chat message based on comparing a leximarker contextual value of the chat message with a leximarker contextual threshold.

* * * * *